US012680889B2

(12) United States Patent　　　　　(10) Patent No.:　US 12,680,889 B2

O'Donnell et al.　　　　　　　　　　　(45) Date of Patent:　　　Jul. 14, 2026

(54) FORCE DETECTION BASED ON POSITION AND/OR MOVEMENT OF MAGNETICALLY SENSITIVE MATERIAL

(71) Applicant: Analog Devices International Unlimited Company, County Limerick (IE)

(72) Inventors: Alan J. O'Donnell, Castletroy (IE); Javier Calpe Maravilla, Algemesi (ES); Jan Kubík, Limerick (IE); Jochen Schmitt, Biedenkopf (DE); Shaun Bradley, Patrickswell (IE); Stanislav Jolondcovschi, Carlow (IE); Padraig L. Fitzgerald, Mallow (IE); Alfonso Berduque, Crusheen (IE); Gavin Patrick Cosgrave, Enniscorthy (IE); Michael P. Lynch, Bruff (IE); Eoin Edward English, Pallasgreen (IE)

(73) Assignee: Analog Devices International Unlimited Company, Limerick (IE)

( * ) Notice: Subject to any disclaimer, the term of this patent is extended or adjusted under 35 U.S.C. 154(b) by 219 days.

(21) Appl. No.: 18/364,268

(22) Filed: Aug. 2, 2023

(65) Prior Publication Data

US 2024/0044726 A1　　Feb. 8, 2024

Related U.S. Application Data

(60) Provisional application No. 63/370,439, filed on Aug. 4, 2022, provisional application No. 63/370,451, filed on Aug. 4, 2022.

(51) Int. Cl.
*G01L 1/12*　　　　　(2006.01)
*B25J 19/02*　　　　　(2006.01)

(52) U.S. Cl.
CPC ................. *G01L 1/12* (2013.01); *B25J 19/02* (2013.01)

(58) Field of Classification Search
CPC .................................... G01L 1/12; B25J 19/02
(Continued)

(56) References Cited

U.S. PATENT DOCUMENTS

| | | | |
|---|---|---|---|
| 3,956,938 A | 5/1976 | Carrico | |
| 3,970,112 A | 7/1976 | Bernard | |

(Continued)

FOREIGN PATENT DOCUMENTS

| | | |
|---|---|---|
| CN | 102737803 | 10/2012 |
| CN | 1041133606 | 11/2014 |

(Continued)

OTHER PUBLICATIONS

Translation of DE-102009040486-B3 (Year: 2011).*

(Continued)

*Primary Examiner* — Nathaniel T Woodward

(74) *Attorney, Agent, or Firm* — Knobbe, Martens, Olson & Bear, LLP

(57) ABSTRACT

Aspects of this disclosure relate to force based on movement of magnetically sensitive material. In embodiments, first magnetically sensitive material and second magnetically sensitive material can be in an initial position. According to such embodiments, one or more sensors to detect force based on relative position of the first magnetically sensitive material and the second magnetically sensitive in a second position. Related systems and methods for force detection are disclosed.

20 Claims, 22 Drawing Sheets

(58) Field of Classification Search

USPC ...................................................... 73/862.69

See application file for complete search history.

(56) References Cited

U.S. PATENT DOCUMENTS

| | | | |
|---|---|---|---|
| 4,588,348 A * | 5/1986 | Beni | G01V 3/08 |
| | | | 414/730 |
| 4,686,469 A | 8/1987 | Lewis | |
| 4,906,877 A | 3/1990 | Ciaio | |
| 5,325,869 A * | 7/1994 | Stokes | G01L 5/169 |
| | | | 600/595 |
| 5,502,378 A | 3/1996 | Atteberry et al. | |
| 6,159,378 A | 12/2000 | Holman et al. | |
| 6,392,562 B1 | 5/2002 | Boston et al. | |
| 6,623,984 B1 | 9/2003 | Fleischman et al. | |
| 6,764,861 B2 | 7/2004 | Prinz et al. | |
| 6,982,501 B1 | 1/2006 | Kotha et al. | |
| 7,446,524 B2 | 11/2008 | Tondra | |
| 7,575,934 B2 | 8/2009 | Atwood | |
| 7,609,054 B2 | 10/2009 | Tondra et al. | |
| 7,892,856 B2 | 2/2011 | Grate et al. | |
| 8,011,424 B2 | 9/2011 | Murray | |
| 8,190,372 B2 | 5/2012 | Kahiman et al. | |
| 8,283,912 B2 | 10/2012 | Nieuwenhuis et al. | |
| 8,339,370 B2 | 12/2012 | Yun et al. | |
| 8,400,410 B2 | 3/2013 | Taylor et al. | |
| 8,453,505 B2 | 6/2013 | Erdler et al. | |
| 8,689,981 B2 | 4/2014 | Stone et al. | |
| 8,779,532 B2 | 7/2014 | O'Donnell et al. | |
| 8,815,610 B2 | 8/2014 | Berman et al. | |
| 9,041,150 B2 | 5/2015 | O'Donnell et al. | |
| 9,098,141 B2 | 8/2015 | Ciesla et al. | |
| 9,103,824 B2 | 8/2015 | Ovsyanko | |
| 9,157,891 B2 | 10/2015 | Ovsyanko et al. | |
| 9,304,131 B2 | 4/2016 | Ovsyanko | |
| 9,678,064 B2 | 6/2017 | Djennati et al. | |
| 9,737,244 B2 | 8/2017 | Ziale et al. | |
| 9,786,969 B2 | 10/2017 | Masias | |
| 9,841,421 B2 | 12/2017 | Dittmer et al. | |
| 9,999,369 B2 | 6/2018 | Ziale et al. | |
| 10,092,903 B2 | 10/2018 | Prins et al. | |
| 10,145,906 B2 | 12/2018 | O'Donnell et al. | |
| 10,620,151 B2 | 4/2020 | Berduque et al. | |
| 10,627,269 B2 | 4/2020 | Mazumdar et al. | |
| 10,730,743 B2 | 8/2020 | Kierse et al. | |
| 10,733,906 B2 | 8/2020 | Pascall | |
| 10,809,195 B2 | 10/2020 | Krishnamoorthy et al. | |
| 10,967,122 B2 | 4/2021 | Cima | |
| 11,035,498 B2 | 6/2021 | Alfadhel et al. | |
| 11,085,554 B2 | 8/2021 | Mou et al. | |
| 11,119,161 B2 | 9/2021 | Iwasaki et al. | |
| 11,127,716 B2 | 9/2021 | McGeehan et al. | |
| 11,214,061 B2 | 1/2022 | Glusti et al. | |
| 11,228,310 B2 | 1/2022 | Zhao et al. | |
| 11,231,635 B2 | 1/2022 | Moon et al. | |
| 11,307,055 B2 | 4/2022 | Schmitt | |
| 11,363,427 B2 | 6/2022 | Volkerink et al. | |
| 11,525,820 B2 | 12/2022 | Meier et al. | |
| 11,666,913 B2 | 6/2023 | Beaumont et al. | |
| 11,735,349 B2 | 8/2023 | Sturcken et al. | |
| 2003/0000833 A1 | 1/2003 | Mansouri et al. | |
| 2008/0060710 A1 | 3/2008 | Carlson et al. | |
| 2008/0128391 A1 | 6/2008 | Chen et al. | |
| 2011/0206560 A1 | 8/2011 | Neijzen et al. | |
| 2011/0304326 A1 | 12/2011 | Sandhu | |
| 2016/0064126 A1 | 3/2016 | Timonen et al. | |
| 2017/0328931 A1 | 11/2017 | Zhang et al. | |
| 2017/0336273 A1 | 11/2017 | Elangovan et al. | |
| 2019/0135614 A1 | 5/2019 | Kierse et al. | |
| 2020/0072783 A1 | 3/2020 | Berney et al. | |
| 2021/0148850 A1 | 5/2021 | Berduque et al. | |
| 2021/0262973 A1 | 8/2021 | Berduque et al. | |
| 2021/0322681 A1 | 10/2021 | Bolognia et al. | |
| 2022/0362778 A1 | 11/2022 | Foster et al. | |
| 2023/0098962 A1 | 3/2023 | O'Donnell et al. | |
| 2023/0152166 A1 | 5/2023 | O'Donnell et al. | |
| 2023/0264198 A1 | 8/2023 | O'Donnell et al. | |
| 2023/0349987 A1 | 11/2023 | O'Donnell et al. | |
| 2023/0383855 A1 | 11/2023 | O'Donnell et al. | |
| 2023/0400292 A1 * | 12/2023 | Li | B25J 19/027 |
| 2024/0044725 A1 | 2/2024 | O'Donnell et al. | |
| 2024/0272019 A1 * | 8/2024 | Engeberg | G01P 15/105 |

FOREIGN PATENT DOCUMENTS

| | | | |
|---|---|---|---|
| CN | 205404333 | 7/2016 | |
| CN | 108957365 | 12/2018 | |
| CN | 111600456 | 8/2020 | |
| CN | 110671957 | 5/2021 | |
| DE | 102009040486 B3 * | 4/2011 | ............... G01L 1/14 |
| EP | 2988107 A1 * | 2/2016 | ............. G01L 5/228 |
| EP | 3594650 A1 | 1/2020 | |
| FR | 2671870 | 7/1992 | |
| KR | 1020150088682 | 8/2015 | |
| WO | WO-8404820 A1 * | 12/1984 | ............ B25J 13/082 |
| WO | WO 2006/122203 | 11/2006 | |
| WO | WO 2021/081103 | 4/2021 | |
| WO | WO 2022/093771 A1 | 5/2022 | |

OTHER PUBLICATIONS

Translation of EP-2988107-A1 (Year: 2016).*

Yermakov, et al., "Flexible Magnetostrictive Nanocellulose Membranes for Actuation, Sensing, and Energy Harvesting Applications," Frontiers in Materials, Mar. 2020, 7(38): pp. 1-10.

International Search Report issued in International Application No. PCT/EP2023/071216, dated Nov. 30, 2023.

Written Opinion issued in International Application No. PCT/EP2023/071216, dated Nov. 30, 2023.

Adeyiga et al., "Magnetic microparticle concentration and collection using a mechatronic magnetic ratcheting system", PLOS ONE, Feb. 18, 2021, pp. 1-15.

Al-Hetiani et al., "Continuous magnetic droplets and microfluidics: generation, manipulation, synthesis, and detection", Microchim Acta, 186, 55, 2019.

Berkelman et al., "Electromagnetic Haptic Feedback System for Use With a Graphical Display Using Flat Coils and Sensor Array", IEEE Robotics and Automation Letters, Apr. 2020, vol. 5, No. 2, pp. 1618-1625.

Boehler et al., "Sensors in the Autoclave-Modelling and Implementation of the IoT Steam Sterilization Procedure Counter", Sensors, 2021, 21(510) 1-17.

Bruls et al., "Rapid integrated biosensor for multiplexed immunoassays based on actuated magnetic nanoparticles", Lab Chip, 2009, pp. 3504-3510.

Cao et al., "Recent advances in manipulation of micro- and nano-objects with magnetic fields at small scales", Materials Horizons, 2020, 7, pp. 638-666.

Campos et al., "Technologies applied in the monitoring and control of the temperature in the Cold Chain", IEEE, 2018, in 6 pages.

Chae et al., "Bimodal neural probe for highly co-localized chemical and electrical monitoring of neural activites in vivo", Biosensors and Bioelectronics, 2021, vol. 191, pp. 1-11.

Chihiro et al., "Development of Molecular Interaction Assay Using Magneto-Resistance Sensor", The 42nd Annual Meeting of the Molecular Biology Society of Japan, Dec. 2019.

Datta, P., "Magnetic Gels", Polymeric Gels, 2018, pp. 441-465.

D'Uva et al., "Batteryless Wireless Temperature/Humidity Sensor for Item-level Smart Pharma Packaging", IEEE, 2021, pp. 145-149.

Gaster et al., "Matrix-insensitive protein assays push the limits of biosensors in medicine", Nature Medicine, Nov. 2009, 15(11): 1327-1333,.

Germano et al., "A Portable and Autonomous Magnetic Detection Platform for Biosensing", Sensors, May 27, 2009, 9:4119-4137.

Gomez-Pastora et al., "Optimization of Magnetic Blood Cleansing Microdevices", Microfluidics Archives—Flow-3D, pp. 1-24.

Hellebrekers et al., "Soft Magnetic Skin for Continuous Deformation Sensing", Advanced Intelligent Systems, Jul. 25, 2019, 1900025, pp. 1-6.

(56) References Cited

OTHER PUBLICATIONS

Ji et al., "An Online Cold-Chain Monitoring System Powered by Miniature Smart Tag and Blockchain", IEEE 5th International Conference on Universal Village, 2020, in 5 pages.

Juncker et al., "Cross-reactivity in antibody microarrays and multiplexed sandwich assays: shedding light on the dark side of multiplexing", Current Opinion in Chemical Biology, 2014, vol. 18, pp. 29-37.

Kabe et al., "Application of high-performance magnetic nanobeads to biological sensing devices", Analytical and Bioanalytical Chemistry, Jan. 9, 2019, 411:1825-1837.

Le et al., "Inkjet-Printed Graphene for Flexible Micro-Supercapacitors", IEEE, Aug. 15-18, 2011, pp. 67-71.

Lee et al., "Experimental Investigation of Magnetic Particle Movement in Two-Phase Vertical Flow under an External Magnetic Field Using 2D LIF-PIV", Applied Sciences, Jun. 8, 2020, 10, 3976, pp. 1-17.

Lee et al., "Thermomagnetic Convection of Ferrofluid in an Enclosure Channel with an Internal Magnetic Field", Micromachines, Aug. 21, 2019, 10, 553, pp. 1-8.

"Magnetic Separation of Sepsis Pathogen Out of Infected Blood" Medgadget Editors, Mar. 25, 2009.

Maity et al., "Manipulation of Magnetic Properties by Tunable Magnetic Dipoles in a Ferromagnetic Thin Film", IEEE Magnetic Letters, Mar. 21, 2017, vol. 8, in 4 pages.

Mohapatra et al., "Electric Stimulus-Responsive Chitosan/MNP Composite Microbeads for Drug Delivery System", IEEE Transactions on Biomedical Engineering, Jan. 2020, vol. 67, No. 1, pp. 226-233.

Mohammadi et al., "Fingertip Force Estimation via Inertial and Magnetic Sensors in Deformable Object Manipulation" IEEE, Apr. 8-11, 2016, pp. 284-289.

Ngyuen, N.T., "Micro-magnetofluidics: Interactions between magnetism and fluid flow on the microscale", Microfluidics and Nanofluidics, Nov. 16, 2011, in 17 pages.

Osterfeld et al., "MagArray Blochips for Protein and DNA Detection with Magnetic Nanotags: Design, Experiment, and Signal-to-Noise Ratio", Chapter 15 of Microarrays, 2008, pp. 299-314.

"Polystyrene Magnetic Particles", MagSphere Inc., 2021.

Rife et al., "Design and performance of GMR sensors for the detection of magnetic microbeads in biosensors", For Sensors and Actuators A, Mar. 19, 2003, in 34 pages.

Shafiq et al., "A Battery-Free Temperature Sensor With Liquid Crystal Elastomer Switching Between RFID Chips", IEEE Access, May 21, 2020, vol. 8, pp. 87870-87883.

Shanko et al., Microfluidic Magnetic Mixing at Low Reynolds Numbers and in Stagnant Fluids, Micromachines, Oct. 29, 2019, 10, 731, pp. 1-23.

Sigma-Aldrich, List of Polystyrene Products, available at: https://www.sigmaaldrich.com/us/en/search/polystyrene?focus=products &page=1&perpage=30&sort=relevance&term=polystyrene&type=product (accessed Oct. 1, 2021).

Tian, B., "Magnetic Nanoparticle Based Biosensors for Pathogen Detection and Cancer Diagnostics", Digital Comprehensive Summaries of Uppsala Dissertations from the Faculty of Science and Technology 1647, May 4, 2018, in 56 pages.

"Use of Paraffin Wax with Different Melting Points", King Honor International, Jun. 17, 2019.

Wang et al., "A Mechanically Tunable Artificial Magnetic Conductor using 3-D Printing Technology", IEEE, Sep. 25-27, 2018, in 4 pages.

Wang et al., "Advances in Giant Magnetoresistance Biosensors With Magnetic Nanoparticle Tags: Review and Outlook", IEEE, Jul. 2008, 44(7): 1687-1702.

Wanganoo et al., "Real-Time Data Monitoring in Cold Supply Through NB-IoT", IEEE, Jul. 1-3, 2020, in 6 pages.

Xu et al., "Giant magnetoresistive biochip for DNA detection and HPV genotyping", Biosensors and Bioelectronics, Sep. 15, 2008, vol. 24, pp. 99-103.

Xu et al., "Giant Magnetoresistive Sensors for DNA Microarray", IEEE, Nov. 2008, 44(11): 3989-3991.

Yu et al., "Giant magnetoresistive biosensors for molecular diagnosis: surface chemistry and assay development", Proceedings of SPIE 7035, Biosensing, Aug. 29, 2008.

Yu et al., "Magnetic sensors as a novel multiplex immunoassay platform with high sensitivity", MagArray.

Yu et al., "Sensitive detection of cTnl in whole blood on MagArray biosensors", MagArray.

Yu et al., "Multiplex Autoantibody Detection Using MagArray GMR Biosensors", MagArray.

Yunas et al., "Polymer-Based MEMS Electromagnetic Actuator for Biomedical Application: A Review", Polymers, May 22, 2020, 12, 1184, pp. 1-21.

Yasui et al., "Magnetic Micro Actuator with Neutral Buoyancy and 3D Fabrication of Cell Size Magnetized Structure" IEEE, May 14-18, 2012, pp. 745-750.

Zhang et al., "A perspective on magnetic microfluidics: Towards an intelligent future", Biomicrofluidics, 2022, vol. 16, in 9 pages.

Zheng et al., "A Disposable Array Chip using Temperature-Responsive Color Change to Record Temperature History in Terminal Cold Chain Transportation", IEEE, Jun. 23-27, 2019, pp. 1941-1944.

Zhou et al., "Self-powered Continuous Time-Temperature Monitoring for Cold-Chain Management"; IEEE, 2017, pp. 879-882.

Hsieh et al., "Multilayered vectorial fluxgate magnetometer based on PCB technology and dispensing process," Measurement Science and Technology, 2019.

* cited by examiner

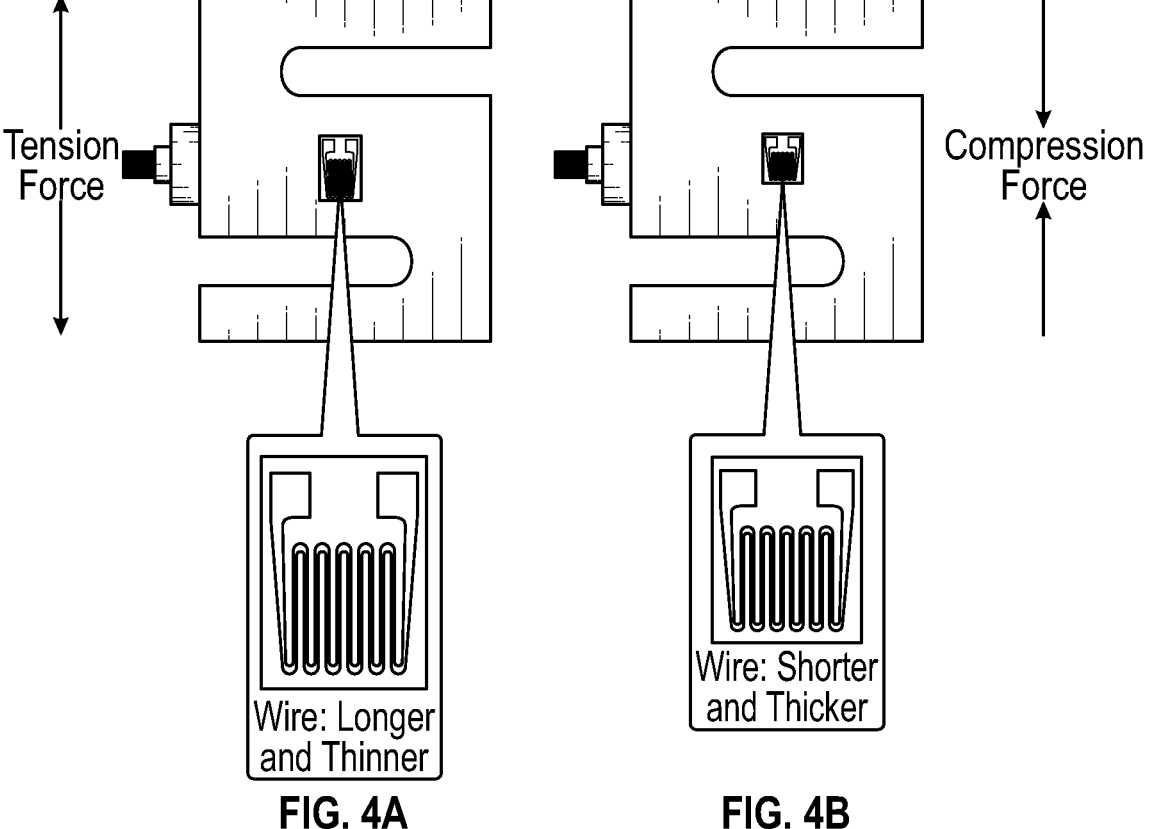
FIG. 4A            FIG. 4B

174A

174B

172A

172B

174A

174B

172A

172B

201

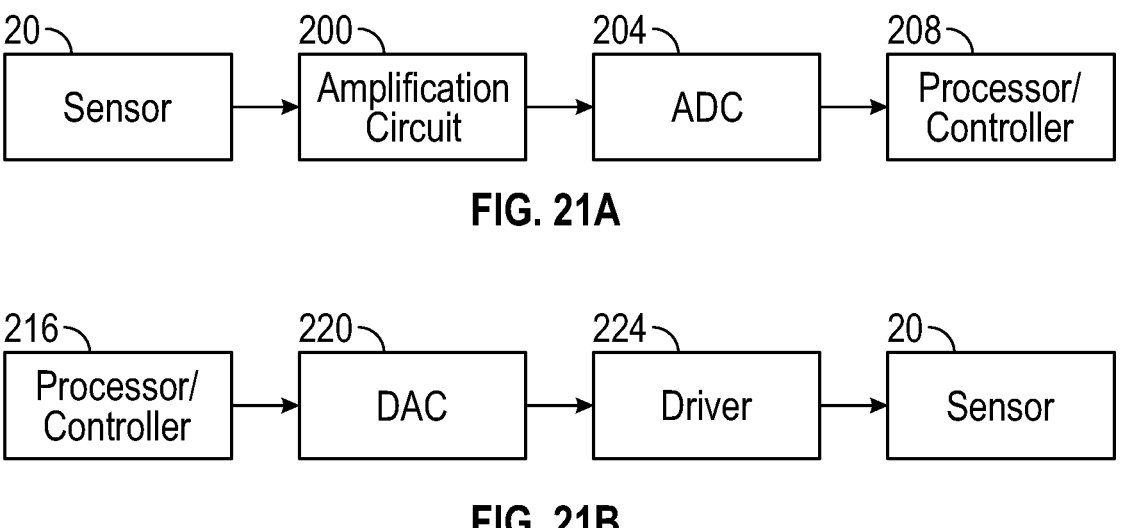
FIG. 21A
FIG. 21B
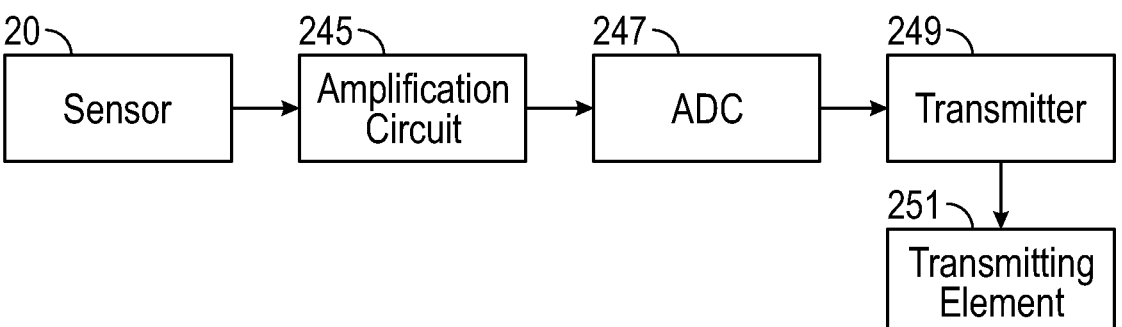
FIG. 21C

FORCE DETECTION BASED ON POSITION AND/OR MOVEMENT OF MAGNETICALLY SENSITIVE MATERIAL

CROSS REFERENCE TO RELATED APPLICATIONS

Any and all applications for which a foreign or domestic priority claim is identified in the Application Data Sheet as filed with the present application are hereby incorporated by reference under 37 C.F.R. § 1.57. This application claims the benefit of priority of U.S. Provisional Application No. 63/370,439, filed Aug. 4, 2022 and titled "FORCE DETECTION BASED ON POSITION AND/OR MOVEMENT OF MAGNETICALLY SENSITIVE MATERIAL," the disclosure of which is hereby incorporated by reference in its entirety and for all purposes. This application claims the benefit of priority of U.S. Provisional Application No. 63/370,451, filed Aug. 4, 2022 and titled "FORCE DETECTION BASED ON PROFILE OF MAGNETICALLY SENSITIVE MATERIAL," the disclosure of which is hereby incorporated by reference in its entirety and for all purposes.

This application relates to U.S. application Ser. No. 18/364,255, filed on even date herewith and titled "FORCE DETECTION BASED ON PROFILE OF MAGNETICALLY SENSITIVE MATERIAL," the disclosure of which is hereby incorporated by reference in its entirety and for all purposes.

BACKGROUND

TECHNICAL FIELD

Embodiments of the disclosed technology relate to detecting force based on movement of magnetically sensitive material.

DESCRIPTION OF RELATED TECHNOLOGY

Force detection and/or haptic sensing are useful in a variety of applications and for a variety of purposes. Haptic sensing systems can detect a touch or other contact forces on a surface. Certain force detection and/or haptic systems can be based on capacitive technology. There are technical challenges related to such systems.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a system with force detection. The system comprises first magnetically sensitive material, second magnetically sensitive material, and one or more sensors configured to detect a force based on relative positions of the first magnetically sensitive material and the second magnetically sensitive material.

The first magnetically sensitive material and the second magnetically sensitive material can be in different planes in an initial position, and the one or more sensors can detect the force based on alignment of the first magnetically sensitive material and the second magnetically sensitive material. The first magnetically sensitive material and the second magnetically sensitive material can be aligned in an initial position, and the one or more sensors can detect the force based on the first magnetically sensitive material and the second magnetically sensitive material being in different planes.

The first magnetically sensitive material can include magnetically sensitive particles in a fluid. The first magnetically sensitive material can include magnetically sensitive particles in a gel. The first magnetically sensitive material can include magnetically sensitive particles in a phase change material. The first magnetically sensitive material can be embedded in a film or a flexible substrate. The first magnetically sensitive material can include magnetically sensitive particles having one or more properties to increase detectability and/or to increase sensitivity of the one or more sensors. The first magnetically sensitive material can include a solid magnetic structure.

The first magnetically sensitive material and the second magnetically sensitive material can be included within a container. The force can be applied to a surface of the container. The one or more sensors can be integrated with the container.

The system can include a processing circuit configured to detect a profile of the first and second magnetically sensitive material indicative of the force based on at least one output signal from the one or more sensors.

The one or more sensors can include a magnetic sensor. The one or more sensors can include an inductive sensor. The one or more sensors can detect force by at least detecting a direction of the force.

The system can include a container that contains the first and second magnetically sensitive material and inert material configured to interact with the container and first magnetically sensitive material.

The first magnetically sensitive material and the second magnetically sensitive material can have substantially a same composition.

Another aspect of this disclosure is a method of force detection. The method includes providing a container with first magnetically sensitive material and second magnetically sensitive material therein in an initial position; and detecting, using one or more sensors, a force applied to the container based on relative positions of the first magnetically sensitive material and the second magnetically sensitive material in a second position, wherein the second position is different than the initial position.

The first magnetically sensitive material can be in a different plane than the second magnetically sensitive material in the initial position. The first magnetically sensitive material and the second magnetically sensitive material can be aligned in the second position.

The force can be associated with a touch. The force can be a shear force.

The first magnetically sensitive material can include magnetically sensitive particles in a fluid. The first magnetically sensitive material can include magnetically sensitive particles in a phase change material. The first magnetically sensitive material can include magnetically sensitive particles embedded in a film. The first magnetically sensitive material can include a solid magnetic structure.

The detecting can be performed using one or more magnetic sensors. The detecting can be performed using one or more inductive sensors.

The first magnetically sensitive material and the second magnetically sensitive material can have substantially a same composition.

Another aspect of this disclosure is a method of force detection. The method includes providing a container with magnetically sensitive material therein; and detecting, using one or more sensors, a profile of the magnetically sensitive material in the container associated with a force applied to the container, wherein the profile includes magnetically sensitive material concentrated in one or more particular areas within the container.

The container can include one or more structures configured to contribute to actively displace the magnetically sensitive material in response to the force applied to the container. The one or more structures can include inert material.

The detecting can include detecting a signature that is based on a combination of the container, the profile of the magnetically sensitive material, and the one or more sensors.

The container can include one or more structures having a mechanical structure configured to concentrate the magnetically sensitive material in the one or more particular areas.

An object can apply the force to container. The object can include a mechanical structure configured to concentrate the magnetically sensitive material in the one or more particular areas.

The profile can include magnetically sensitive material concentrated in at least two particular areas within the container.

The one or more sensors can be included in a robotic handling device. The one or more sensors can be included in at least one of a docking station or a charging port. The one or more sensors can be included in an interlocking mechanism.

The magnetically sensitive material can include magnetically sensitive particles in a phase change material. The magnetically sensitive material can include magnetically sensitive particles in a fluid. The magnetically sensitive material can include magnetically sensitive particles embedded in a film.

The method can include detecting temperature with a temperature sensor integrated with the container.

Another aspect of this disclosure is a system with force detection. The system includes magnetically sensitive material within a container, one or more structures configured to concentrate at least some of the magnetically sensitive material in one or more particular areas within the container in response to a force applied to the container, and one or more sensors configured to detect a profile of the magnetically sensitive material associated with the force applied to the container.

The one or more structures can include inert material configured to contribute to actively displace the magnetically sensitive material in response to the force applied to the container.

The one or more structures can be external to an inner volume of the container.

The one or more structures can be integrated with a side of the container opposite to where the force is applied to the container.

The system can be included in a robotic handling device. The system can be included in a docking station or a charging port.

The magnetically sensitive material can include magnetically sensitive particles in a phase change material. The magnetically sensitive material can include magnetically sensitive particles in a fluid. The magnetically sensitive material can include magnetically sensitive particles embedded in a film.

The system can include a temperature sensor integrated with the container.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 4A and 4B are drawings associated with detecting film movement based on measuring resistance of conductive material according to embodiments.

FIGS. 21A, 21B, and 21C are schematic circuit diagrams that includes magnetic sensors and corresponding circuits for driving a magnetic sensor or processing a signal from a magnetic sensor.

DETAILED DESCRIPTION OF CERTAIN EMBODIMENTS

Figures 1A, 1B, 1C, 2A, 2B, 2C:
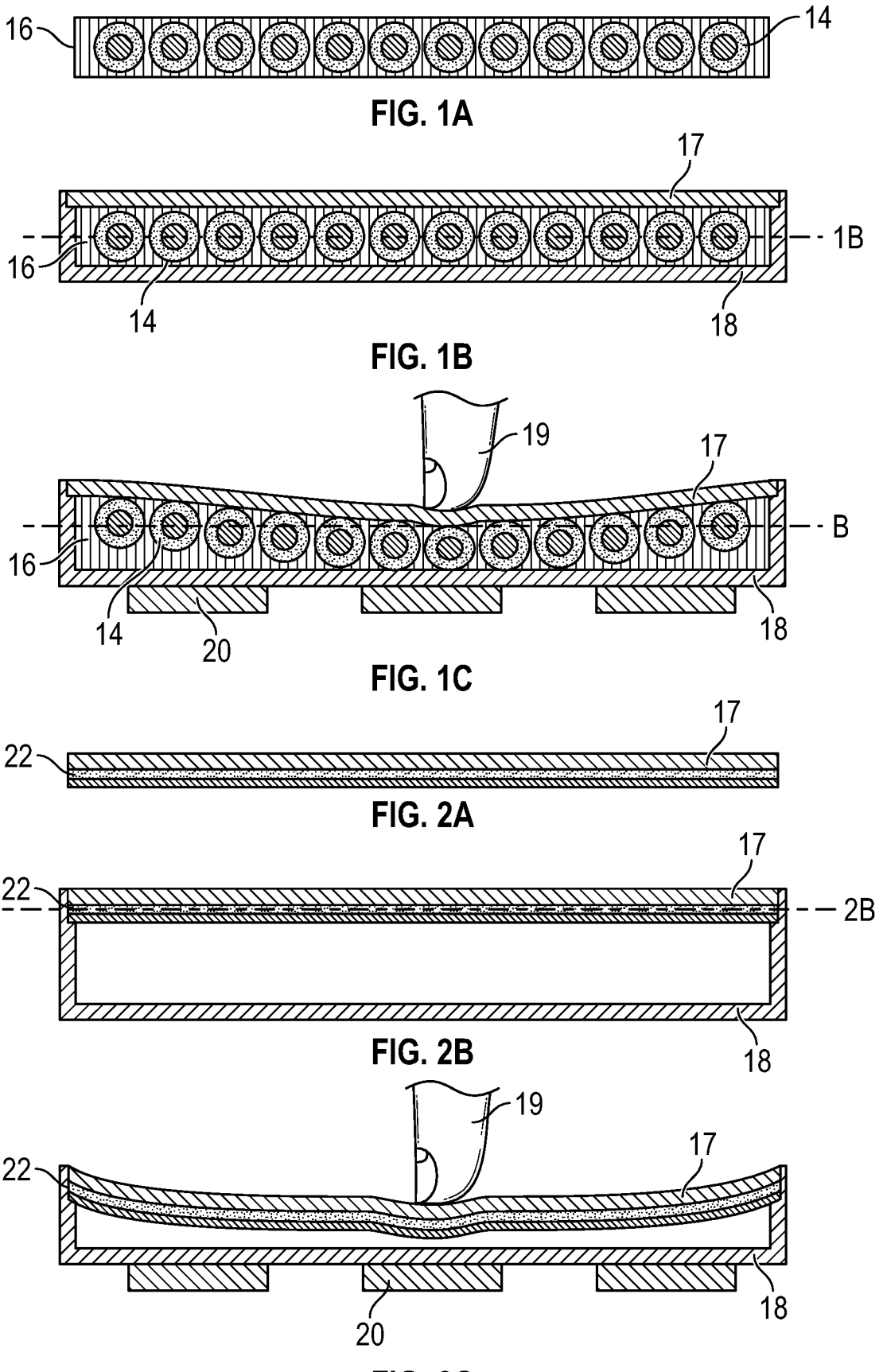
FIGS. 1A, 1B, and 1C are schematic side or cross-sectional views of a haptic sensor system that includes magnetically sensitive particles according to an embodiment.
FIGS. 2A, 2B, and 2C are schematic side or cross-sectional views of a haptic sensor system that includes a layer of magnetically sensitive material according to an embodiment.
Figure 3A:
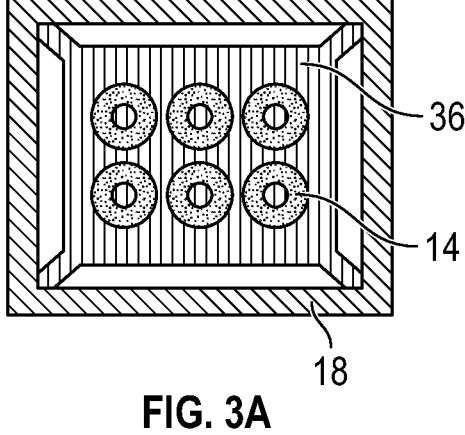
FIGS. 3A, 3B, 3C, and 3D illustrate example plan view of systems that include magnetically sensitive particles embedded within a film or flexible substrate in different arrangements according to embodiments.
Figure 3B:
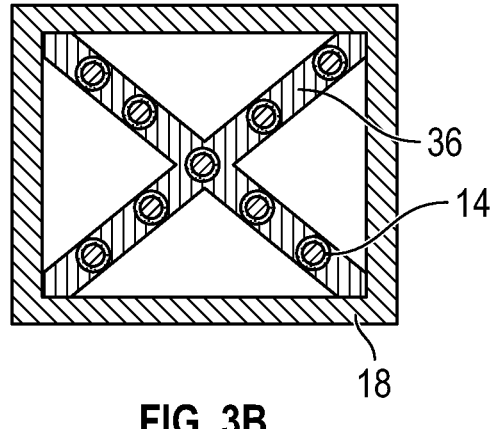
Figure 3C:
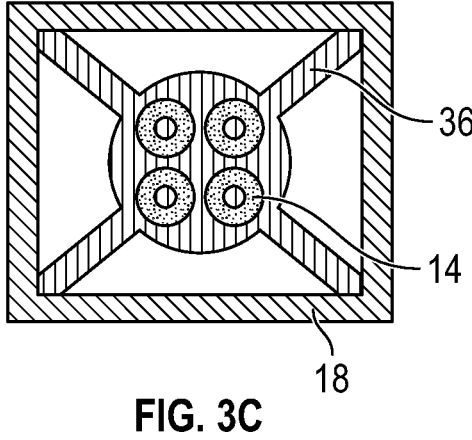
Figure 3D:
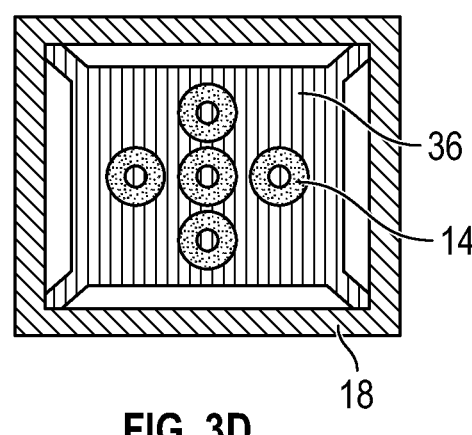

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the illustrated elements. Further, some embodiments can incorporate any suitable combination of features from two or more drawings. The headings provided herein are for convenience only and do not necessarily affect the scope or meaning of the claims.

Aspects of this disclosure relate to detecting an applied force based on movement of magnetically sensitive material. For example, a vertical force (e.g., a touch) can be applied to a surface. This can compress or deflect or move a medium in which magnetically sensitive particles are included. A sensor can detect movement of the magnetically sensitive particles and/or a cluster of displaced or compressed particles and generate an output indicative of the applied force. As another example, a force can be applied along the surface and can be similarly detected based on movement of the magnetically sensitive particles or magnetic structure with a defined shape.

One or more sensors can detect force based on relative positions of first magnetically sensitive material and second magnetically sensitive material. In certain applications, the first magnetically sensitive material and the second magnetically sensitive material are in different planes in an initial position, and the one or more sensors are configured to detect the force based on alignment of the first magnetically sensitive material and the second magnetically sensitive material. Force detection systems can include magnetically sensitive material on different planes. Applied force can cause magnetically sensitive material on the different planes to realign as a result of compression or deflection to produce an electrical signature indicative of the applied force. According to some other applications, the first magnetically sensitive material and the second magnetically sensitive material are aligned in an initial position, and the one or more sensors are configured to detect the force based on the first magnetically sensitive material and the second magnetically sensitive material being in different planes.

A shape or profile associated with magnetically sensitive material can be detected. Force detection systems can include one or more structures combining to actively deform magnetically sensitive structures in specific areas. Such structure(s) can include one or more inert structures and/or a structure embedded within a force detection system. These structures can have specific shapes or profiles to displace particles in certain areas or regions relative to sensing structures depending on the applied forces. A topography can be incorporated within the container/layers/surfaces holding the particles to improve the sensitivity/detection of the profile or shape of the magnetically sensitive material associated with the deformation. The combination of a container (e.g., material, shape and/or topography, etc.), magnetically sensitive material (e.g., structure size and/or shape) within the container, and one or more sensors (e.g., position and/or shape) can provide a discernible signature indicative of applied force.

Magnetically sensitive material can include magnetically sensitive particles within a medium. Magnetically sensitive particles disclosed herein can be arranged to enhance detectability of a cluster or shape and/to detect applied force. A combination of certain shapes compressed can be more easily detectable with certain sensing structures. Such a combination can improve the sensitivity for detecting the force and/or the movement of magnetically sensitive particles within the medium. Magnetically sensitive particles may also incorporate functional coatings which could (for example) reduce friction between particles, increase friction/abrasion, react chemically in a specific/desired way when in contact/compression against specific surface materials, have an optical response to specific wavelengths of light (to aid optical detection), behave in a specific desired way depending on the specifications of the application (such as repelling electrically each other to deal with the detection if higher forces), or any suitable combination thereof.

Force detection systems disclosed herein can include magnetically sensitive particles included within phase change material or other material that changes viscosity over temperature.

Embodiments disclosed herein can achieve advantages over other systems and methods of force detection. Force detection can be implemented by detecting movement or position of magnetically sensitive material as opposed to other force detection methods. Accurate force measurements can be obtained using magnetically sensitive particles and/or systems disclosed herein. Detecting alignment of magnetically sensitive structures that were previously on different planes can provide reliable and accurate force detection. The position of sensing structures combined with magnetic particle and/or structure shape and enclosure surface shape and topography can be modified and/or optimized to detect a defined profile. Detecting a shape or profile associated with magnetically sensitive particles can be more robust and/or provide other advantages over detecting a particular area for force detection. Magnetic skin can be implemented to detect temperature in combination with force detection with phase change material. Different surface topologies, sensor shapes, incorporation of inert particles with defined sizes and shapes and/or other elements of the system can be modified and/or combined to enable topography and shape detection. The combination of a container, magnetically sensitive material within the container, and one or more sensors can provide a discernible signature indicative of applied force. Force detection can be enabled and/or disabled above or below certain temperature thresholds in applications that include magnetically sensitive particles within phase change material.

Magnetically sensitive particle shape and/or size can be modified/optimized to improve sensitivity of the system, which can be sensitivity to the specific position or direction of the force. This can also apply to the shape/size location of the magnetic sensing structures incorporated within the system. For example, a patterned sensing structure (e.g., anisotropic magnetoresistive (AMR) sensors, giant magnetoresistance (GMR) sensors, magnetometric resistivity (MMR) sensors, tunnel magnetoresistance (TMR) sensors, inductive sensing, fluxgate, etc.) with a defined shape can be located within the system to detect the movement (or clustering) of magnetic particles in a specific location or direction. The system could also incorporate phase change materials enabling a potential temperature monitoring capability.

Force Detection with Magnetically Sensitive Material

Embodiments disclosed herein relate to magnetically sensitive particles within a medium, such as a film or a flexible substrate or a gel. Positions of the magnetically sensitive particles can change in response to an applied force. The force can be applied to a surface that causes the gel or film to deform. The force can be applied by a user touching the surface, for example. In this example, a finger can apply force by touching the surface. A sensor can sense movement and/or position of the magnetically sensitive particles that is indicative of the direction and/or intensity of the applied force. This force detection can be included in a haptic sensing system.

FIGS. 1A, 1B, and 1C are schematic side or cross-sectional views of a haptic sensor system that includes magnetically sensitive particles according to an embodiment. FIG. 1A illustrates magnetically sensitive particles 14 included in a medium 16.

The magnetically sensitive particles 14 can be paramagnetic, ferromagnetic, or diamagnetic. The medium 16 can be a gel or fluid or flexible substrate. In some applications, the medium 16 can include silicone, foam, a flexible or spongy polymer, or the like. The medium 16 can be a film. The magnetically sensitive particles 14 can be paramagnetic, for example. Paramagnetic materials include metals that are weakly attracted to magnets. Examples of paramagnetic materials include lithium, aluminium, tungsten, platinum, and manganese salts. The magnetically sensitive particles 14 can be ferromagnetic. Such magnetically sensitive particles 14 can include one or more suitable ferromagnetic material, such as iron, nickel, or cobalt. In some other applications, the magnetically sensitive particles 14 can be diamagnetic and be repelled from the applied magnetic field. Examples of diamagnetic materials include graphite, gold, bismuth, antimony, quartz, and silver. The magnetically sensitive particles 14 can be electrically conductive in certain applications. The magnetically sensitive particles 14 can be implemented in accordance with any suitable principles and advantages disclosed in one or more of U.S. patent application Ser. No. 17/933,600, filed Sep. 20, 2022; U.S. patent application Ser. No. 18/299,627, filed Apr. 12, 2023; U.S. patent application Ser. No. 18/170,765, filed Feb. 17, 2023; U.S. patent application Ser. No. 18/323,798, filed May 25, 2023; or U.S. patent application Ser. No. 18/053,523, filed Nov. 8, 2022; the the technical disclosures of each of which are herein incorporated by reference in their entireties and for all purposes.

The magnetically sensitive particles 14 can include any suitable combination of features of the magnetically sensitive particles disclosed herein. The magnetically sensitive particles 14 can include one or more of the following materials: iron, cobalt, nickel, graphite, chromium, or any suitable alloy thereof. The magnetically sensitive particles 14 can include one or more of the following materials: Heusler alloys or chromium oxide. In certain applications, magnetically sensitive particles 14 can include polystyrene (PS) magnetic particles. Polystyrene magnetic particles can be synthesized by embedding superparamagnetic iron oxide into polystyrene. Polystyrene magnetic particles can be positively charged (e.g., by amine modification), unmodified, or negatively changed (e.g., by carboxyl modification). In some applications, the magnetically sensitive particles 14 can include streptavidin coated magnetic particles.

In certain applications, the medium 16 can be a liquid or a gel (or flexible substrate) having a viscosity suitable to facilitate movement of the magnetically sensitive particles 14 therein such that the movement or location of the magnetically particles 14 can be used to detect an applied force or deformation. Such a fluid can have a suitable density and viscosity for a particular application. Example fluids for the medium material 16 include without limitation aqueous solutions (e.g., buffers, aqueous electrolytes, aqueous solutions with conductive salts, aqueous solutions without conductive salts, pH buffers, salts in water, etc.), organic solutions (e.g., oils or organic solvents), aqueous or organic gels (e.g., a hydrogel, PVC, polyacrylic acid, a polyvinylalcohol gel, a polydimethylsiloxane gel, agarose-PBS, a PVC gel in organic solvents such as 2-nitrophenyl octyl ether, etc.), water, an alcohol, an oil, or a fluid that allows Brownian motion of magnetically sensitive particles within the fluid. The fluid/gel/material properties can be chosen to deliver a desired particle movement (and thus sensitivity or response) depending to the specific application. In certain applications, the fluid 16 can change viscosity and/or phase with temperature. Such a fluid can be any suitable fluid disclosed in U.S. patent application Ser. No. 18/053,523, filed Nov. 8, 2022, the technical disclosure of which is herein incorporated by reference in its entirety and for all purposes.

In certain applications, the medium 16 can be a film, a sheet of material, a flexible layer, or the like. For example, such a medium 16 can be a film with the magnetically sensitive materials embedded therein, a magnetic film layer incorporated in a flexible laminate structure, a sheet of material or a flexible layer with magnetic material deposited or adhered thereon. The medium 16 can be a flexible substrate. Suitable materials for a film medium 16 can include polymer materials such as SU-8, polyimide, polyvinyl alcohol, polyacrylic acid, polyvinylalcohol, polydimethylsiloxane, poly(3,4-ethylenedioxythiophene), Nafion, polyaniline, or the like. Some such polymer materials are conductive. In some instances, the medium 16 can include a plastic such as polyethylene terephthalate (PET), polyethylene naphthalate (PEN), polyimide, or a transparent plastic. According to some applications, the medium 16 can include a ferroelectric thin film. The medium 16 can include thin glass. The medium 16 can include a metal foil. The medium 16 can have metal traces formed thereon and/or particles attached/embedded. The medium 16 can alternatively or additionally include metallic non-magnetic material such as Au, Cu, or Al. The medium 16 can include magnetic materials such as NiFe, Ni, NiFeCo, CoZrTa, CoFe, or the like. The medium 16 can include gold in certain instances. In some instances, the medium 16 can be a mesh rather than a continuous layer.

The medium 16 can be implemented in accordance with any suitable principles and advantages disclosed in one or more of U.S. patent application Ser. No. 17/933,600, filed Sep. 20, 2022; U.S. patent application Ser. No. 18/299,627, filed Apr. 12, 2023; U.S. patent application Ser. No. 18/170, 765, filed Feb. 17, 2023; U.S. patent application Ser. No. 18/323,798, filed May 25, 2023; or U.S. patent application No. 18/053,523, filed Nov. 8, 2023; the the technical disclosures of each of which are herein incorporated by reference in their entireties and for all purposes.

FIG. 1B illustrates a flexible layer 17 over the medium 16. A container 18 is arranged to retain the magnetically sensitive particles 14 and the medium 16. The container 18 can include flexible material. As illustrated in FIG. 1B, the magnetically sensitive particles 14 are positioned along line 1B in an initial position where no contact force is being applied.

The container 18 can be implemented in accordance with any suitable principles and advantages of a container, an enclosure, a channel, and/or a compartment as disclosed in one or more of U.S. patent application Ser. No. 17/933,600, filed Sep. 20, 2022; U.S. patent application Ser. No. 18/299, 627, filed Apr. 12, 2023; U.S. patent application Ser. No. 18/170,765, filed Feb. 17, 2023; U.S. patent application Ser. No. 18/323,798, filed May 25, 2023; or U.S. patent application Ser. No. 18/053,523, filed Nov. 8, 2023; the technical disclosures of each of which are herein incorporated by reference in their entireties and for all purposes. Such a container 18 can be flexible and/or at least partly deformable.

FIG. 1C illustrates an object 19 applying a force to a surface of the flexible layer 17. The object 19 can be a finger, for example. The force causes the flexible layer 17 and the medium 16 to deform such that the magnetically sensitive particles 14 move. FIG. 1C illustrates that the magnetically sensitive particles 14 have moved relative to the line 1B from the position shown in FIG. 1B due to the applied force.

A plurality of sensors 20 can be integrated with the container 18. For example, the sensors 20 can be implemented on outer surface of the container 18 as shown in FIG. 1C. The sensors 20 can also be embedded within a container, positioned on one or more internal surfaces of a container, or located in another suitable location depending on the specifications of a particular application. The sensors 20 can detect movement and/or position of the magnetically sensitive particles 14 and output an indication of the force applied by the object 19. In some instances, movement of the magnetically sensitive particles 14 is detected by the sensors 20. The positions and/or distribution of magnetically sensitive particles 14 can be detected by the sensors 20 in certain applications. This can detect that such positions and/or distributions are not as expected and/or deviate from an initial or previous position. In some applications, the sensors

20 can detect a deformation that is permanent or lasts for at least a threshold period of time.

The sensors 20 can include any suitable sensor disclosed herein. Sensing magnetically sensitive material can be implemented by, without limitation, magnetic sensors, case conductance measurements, zero-power direction detection measurements, microelectromechanical systems based sensing, optical sensors, resistance based sensing, capacitive sensing, the like, or any suitable combination thereof. Example measurement systems and methods disclosed in U.S. patent application Ser. No. 17/933,600, filed Sep. 20, 2020, the technical disclosure of which is herein incorporated by reference in its entirety and for all purposes. The sensors 20 can include a magnetic sensor array. Such a magnetic sensor array can include magnetoresistive sensors, fluxgate sensors, or the like. The sensors 20 can include inductive sensors in certain applications. An inductive sensor can include a coil having an inductance that changes based on a distance of the magnetically sensitive particles 14 from the coil. For an inductive sensor, the magnetically sensitive particles can be conductive and ferromagnetic for the inductive sensor to achieve relatively high sensitivity.

FIGS. 2A, 2B, and 2C are schematic side or cross-sectional views of a haptic sensor system that includes a layer of magnetically sensitive material according to an embodiment. FIG. 2B illustrates a layer of magnetically sensitive material 22 with a flexible layer 17 thereon. The magnetically sensitive material can be a magnetically hard material. The layer of magnetically sensitive material 22 can be a solid layer of magnetically sensitive material. The layer of magnetically sensitive material 22 can be a film or a screen printed or sputtered or plated layer of magnetically sensitive material.

FIG. 2B illustrates an initial position of the layer of magnetically sensitive material 22 in an initial position where no force is being applied. The layer of magnetically sensitive material 22 is positioned along the line 2B as shown in FIG. 2B.

FIG. 2C illustrates an object 19 applying a force to a surface of the flexible layer 17. The force causes the flexible layer 17 and the layer of magnetically sensitive material 22 to deform. FIG. 2C illustrates that the layer of magnetically sensitive material 22 has moved relative to the position shown in FIG. 2B. The sensors 20 can detect such movement.

In some applications, magnetically sensitive material is part of a mesh. The mesh can include a 2-dimensional sheet of material implanted a grid of magnetically sensitive elements. For instance, a magnetically sensitive element can be included every millimeter in each direction in the sheet of material. Such a mesh can be similar to what is shown in FIGS. 1A-1C and 2A-2C, but with the flexible layer and the magnetically sensitive material being one physical sheet.

In some applications, a medium 16 can be suspended within a container with or without surrounding fluid. In one example, the medium 16 can be suspended in air or an inert gas. In another example, the medium 16 is suspended in a liquid or gel with a viscosity selected to tune the film's sensitivity (degree of movement in response) to an applied force. The medium 16 can be a film tethered to a container. Such a film can be tethered to the inside of the container and arranged such that the medium 16 can deflect in response to an applied force. In certain applications, the medium 16 can return to an initial position when no force is applied due, for example, to elasticity in the material of the film.

FIGS. 3A, 3B, 3C, and 3D illustrate examples of a film 36 with embedded magnetically sensitive particles or structures 14 shown in plan view according to embodiments. The film 36 can be flexible and deform in response to a force. The film 36 can have any suitable shape for a particular application. The film 36 can incorporate different material and/or structures (e.g., mesh, nanomaterials, composite layers, etc.) to facilitate desired movement depending on the specifications of a particular application. The magnetically sensitive particles 14 can have any suitable pattern and/or arrangement within the film 36. One or more of the shape, size, location, pattern and construction of the particles can be selected and/or specifically configured depending on the specifications of a particular application. In the illustrated examples, relatively elastic tethers facilitate deformation of the film 36 and attendant changes in position of the particles 14 in response to an applied force. The film 36 and magnetically sensitive particles can be included in a container 18. One or more of the shape, size, and construction of the tethers to the container can be modified and/or optimized depending on the specifications of a particular application.

Deflection or movement of the film with magnetically sensitive and/or electrically conductive material can be detected in a variety of ways. Sensing magnetically sensitive and/or electrically conductive material can be implemented by, without limitation, magnetic sensors, case conductance measurements, zero-power direction detection measurements, microelectromechanical systems based sensing, optical sensors, resistance based sensing, capacitive sensing, the like, or any suitable combination thereof. Example measurement systems and methods disclosed in U.S. patent application Ser. No. 17/933,600, filed Sep. 20, 2022, the technical disclosure of which is herein incorporated by reference in its entirety and for all purposes. Any suitable principles and advantages of such measurement systems can be implemented for haptic and/or force detection in accordance with any suitable principles and advantages disclosed herein.

As one example, magnetic sensors can be used as discussed with reference to FIG. 1B. Any other suitable sensing method can alternatively or additionally be used. Resistance measurements or capacitance measurements are two more example sensing methods.

FIGS. 4A and 4B are drawings associated with detecting film movement based on measuring resistance of conductive material according to embodiments. Resistance can be measured for conductive films to detect movement of the conductive film. Detection can be detected by detection tension or compression. As shown in FIG. 4A, tension force can cause a wire to become longer and thinner. FIG. 4B shows that with compression force, a wire can become shorter and thicker. A sensor can detect the different resistances associated with tension force and compression force. Multiple turns of the film can be included to enhance force detection with a strain gauge. The strain gauge is a way to measure elongation in which a layer with magnetically sensitive material is covered with a resistive mesh. The strain gauge can sense if resistance changes and provide an indication of a change in shape. The dimensions, shape, and/or thickness of the structures can be modified and/or optimized depending on the specifications of the application.

Figure 5A:
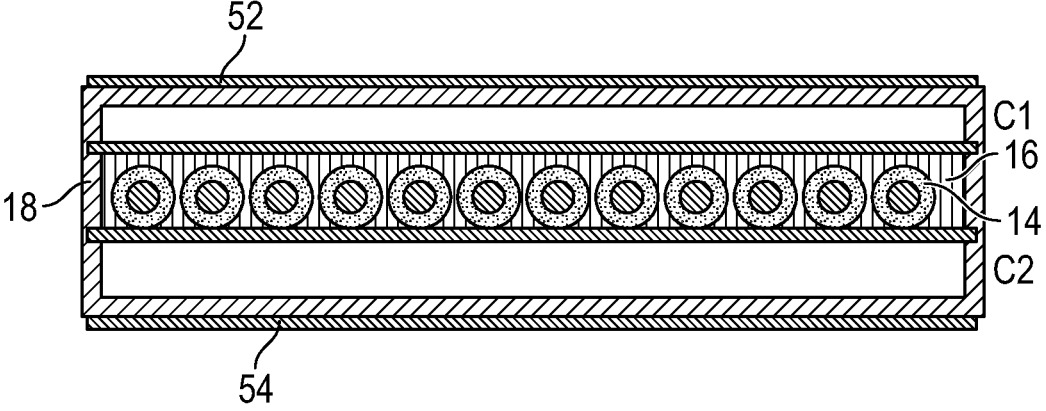
FIGS. 5A and 5B illustrate different film positions associated with detecting film or flexible substrate movement based on measuring capacitance according to embodiments.
Figure 5B:
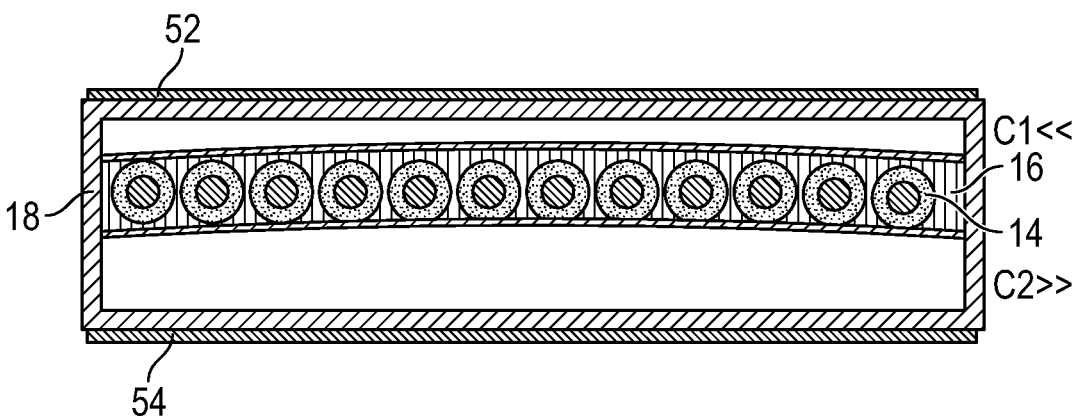

FIGS. 5A and 5B illustrate different film positions associated with detecting film movement based on measuring capacitance according to embodiments. For this method, the magnetically sensitive particles 14 can be electrically conductive. FIG. 5A illustrates an initial position where no force is being applied. As shown in FIG. 5B, the magnetically sensitive particles 14 have moved up relative to the initial position due to an applied force. The capacitance C1 to an upper plate 52 has increased as a result of this movement.

The capacitance C2 to a lower plate 54 has decreased as a result of this movement. The change in capacitance C1 and/or C2 can be detected to measure the applied force.

Figure 6A:
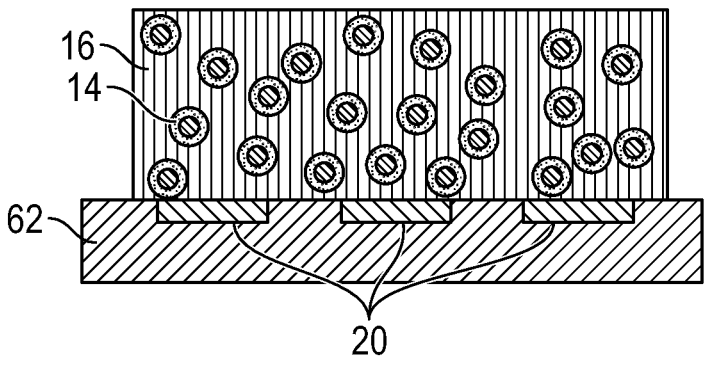
FIGS. 6A, 6B, and 6C illustrate schematic side or cross-sectional views of a system with force detection according to an embodiment.
Figure 6B:
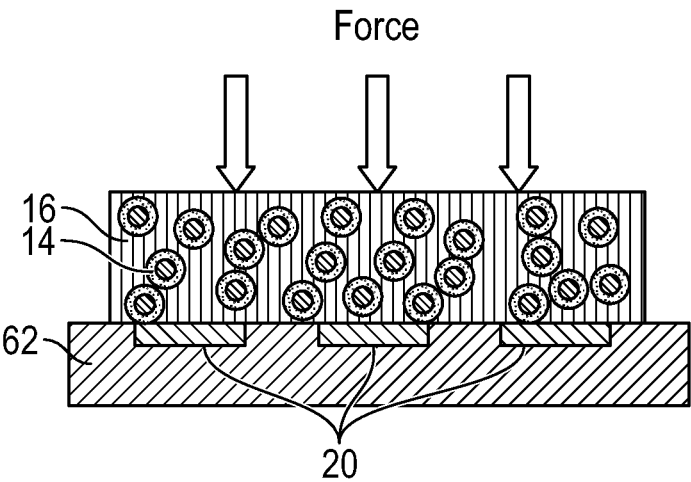
Figure 6C:
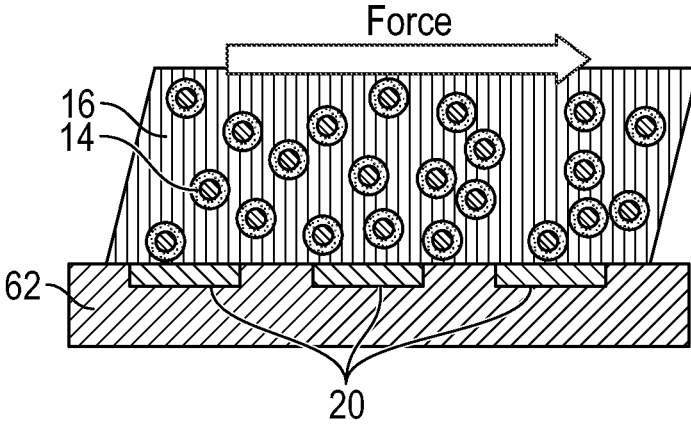

FIGS. 6A, 6B, and 6C illustrate schematic side or cross-sectional views of a system with force detection according to an embodiment. Such a system can be implemented with a temperature sensor to form a magnetic skin. The force detection system can be a haptic sensing system. In certain applications, phase change material can also be incorporated.

As shown in FIG. 6A, magnetically sensitive particles 14 can be distributed within a medium 16 in an initial position. The medium 16 can be a flexible gel or silicone, for example. A plurality of sensors 20 can be implemented on a rigid substrate 62. The sensors 20 can include any suitable sensors, such as magnetic sensors (e.g., magnetoresistive sensors, fluxgate sensors, or the like) or inductive sensors. The sensors 20 can be located in any suitable positions (e.g., embedded in the rigid substrate 62, positioned on top of the rigid substrate 62, etc.). The sensors 20 can have any suitable shape. The surface of the rigid substrate 62 can have any suitable topography depending on the specifications of the application.

FIG. 6B illustrates a vertical force being applied to the system. The vertical pressure can compress the medium 16. With such compression, the magnetically sensitive particles 14 can be positioned closer to the sensors 20. The sensors 20 can output signals associated with a magnetic signal signature for the vertically applied force.

FIG. 6C illustrates a horizontal force being applied to the system. The horizontal force can be a sidewise pressure and/or push. The horizontal force can cause shear deformation of the medium 16. This can cause the magnetically sensitive particles 14 to move sideways in the direction of the horizontal force. The sensors 20 can output signals associated with a magnetic signal signature for the horizontally applied force.

The system of FIGS. 6A to 6C and other force detection systems disclosed herein can be implemented in a variety of applications. Magnetically sensitive particles can be distributed (e.g., randomly) in a gel or flexible material that can form a magnetic skin of a robotic grabber or a prosthetic hand. In some applications, magnetically sensitive particles can be included in silicone, flexible polymers, foam, spongy materials, or the like. A temperature sensor can be combined with a haptic sensor to form a skin with detection of hot and/or cold temperature. Phase change material can also be incorporated within the system. An array of sensors can have a differential field sensing arrangement to reduce and/or eliminate influence of one or more external homogeneous fields. The array of sensors can be sufficiently dense to detect one or more of a shape, a structure, or a surface topography of the object it is touching. In certain applications, relatively small magnets can be implemented in place of magnetically sensitive particles. Such relatively small magnets can be randomly distributed within a fluid.

Figure 7A:
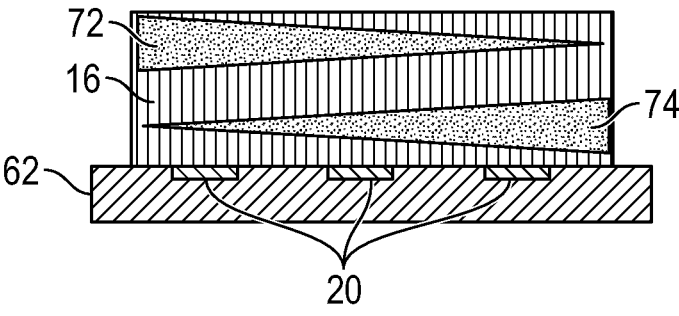
FIGS. 7A, 7B, and 7C illustrate schematic side or cross-sectional views of a system with force detection according to another embodiment.
Figure 7B:
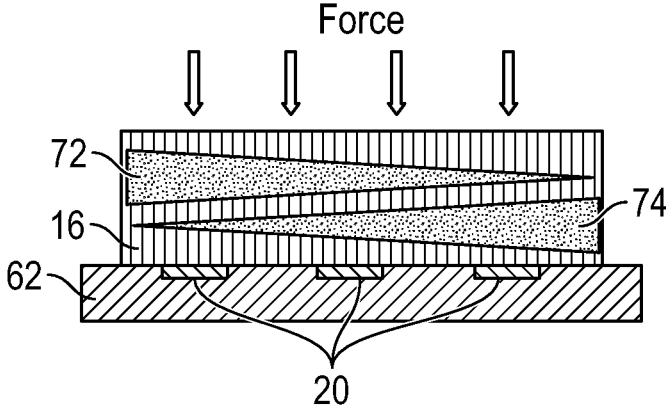
Figure 7C:
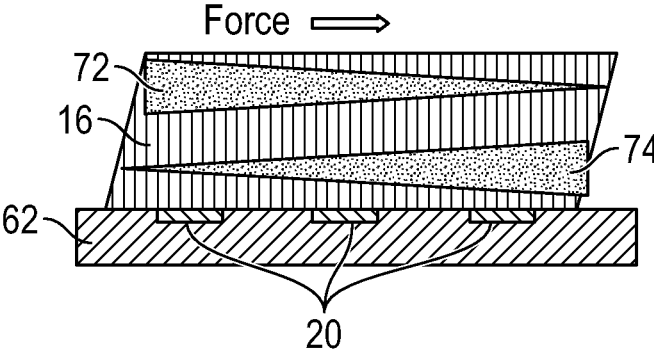

FIGS. 7A, 7B, and 7C illustrate schematic side or cross-sectional views of a system with force detection according to another embodiment. In the system of FIGS. 7A to 7C, magnetic structures 72, 74 of magnetic material are included within the medium 16. The illustrated magnetic structures 72, 74 are wedge structures. Any other suitably shaped magnetic structure can be implemented. FIG. 7A illustrates an initial position. In FIG. 7B, a vertical force is applied to the medium 16 to cause compression of the medium 16 and movement of the magnetic structures 72, 74. This vertical force can be a homogeneous force. In FIG. 7C, a horizontal force is applied to the medium 16 to cause deformation of the medium 16 and movement of the magnetic structures 72, 74. This horizontal force can be an inhomogeneous force. The sensors 20 can detect the movement of the magnetic structures 72, 74 from the position of FIG. 7A to the position of FIG. 7B and/or the position of FIG. 7C. The sensors 20 can output an indication of the force applied to the medium 16. One or more of the shape, profile, or composition of magnetic structures 72 and 74 can be modified and/or optimized to improve the sensitivity and/or response as desired depending on the specific application.

Figure 8:
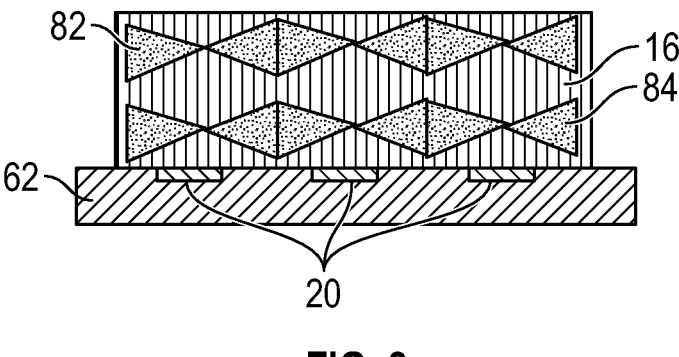
FIG. 8 illustrates a schematic side or cross-sectional view of a force detection system with a periodic structure according to another embodiment.

Magnetic structures in a medium can have a shape that is relatively easy to manufacture and/or calibrate. Such a structure can be periodic and/or achieve a relatively high sensitivity. FIG. 8 illustrates a schematic side or cross-sectional view of a force detection system with periodic magnetic structures 82, 84 according to an embodiment. The force detection system with periodic magnetic structures 82, 84 can achieve a higher sensitivity than force detection systems with magnetic structures 72, 74 of FIGS. 7A to 7C in certain applications.

Figure 9A:
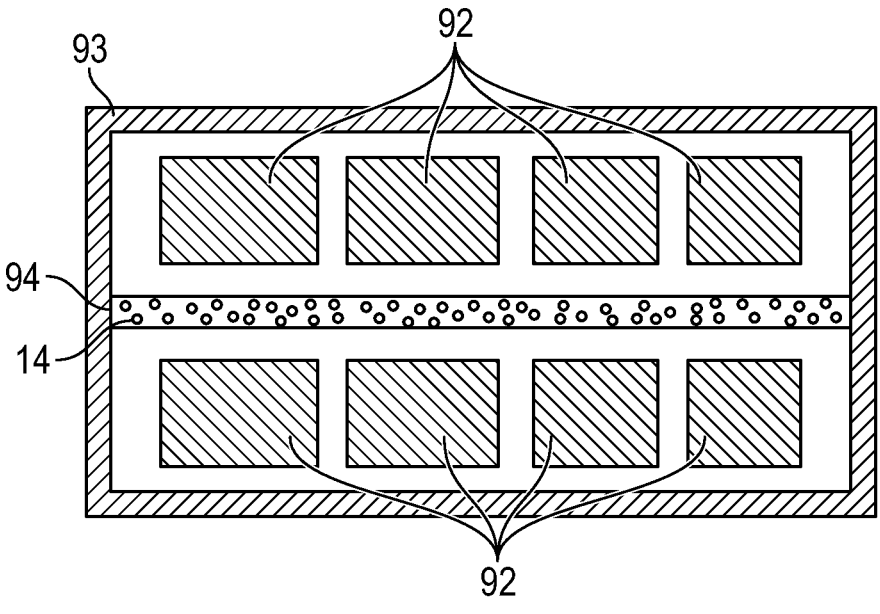
FIGS. 9A and 9B illustrate a schematic side or cross-sectional view of a force detection system with inert material that displaces a layer with magnetically sensitive particles according to an embodiment.
Figure 9B:
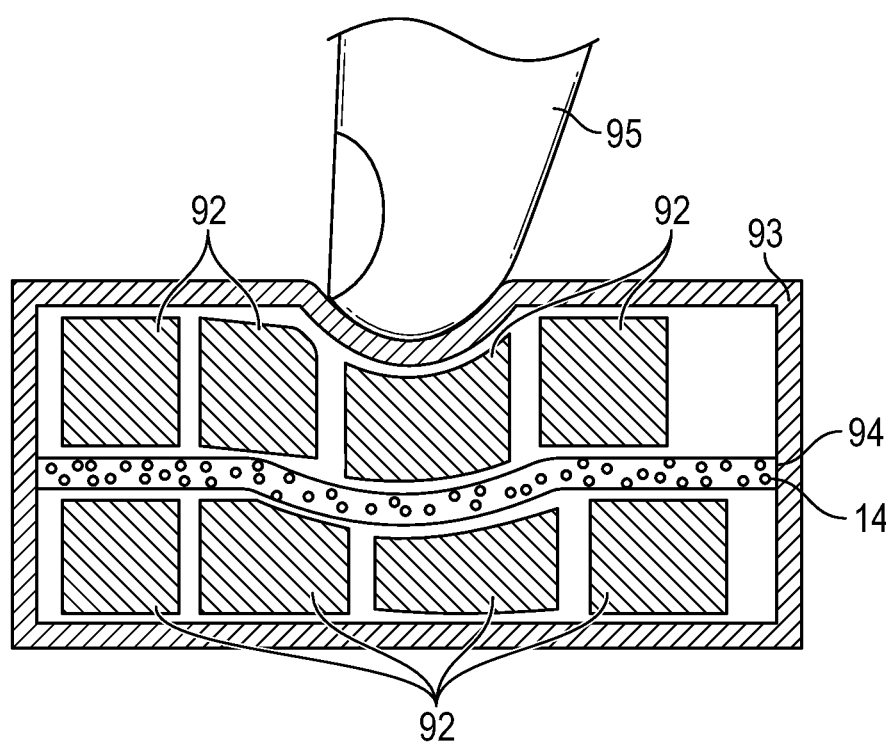

Force detection systems can include one or more structures to assist with active deformation of a medium with magnetically sensitive particles on deflection. The one or more structures can include inert material. FIGS. 9A and 9B illustrate a schematic side or cross-sectional view of a force detection system with inert material 92 that displaces a layer 94 with magnetically sensitive particles 14 according to an embodiment. The inert material 92 can be inert filler material within a flexible enclosure 93. In this system, the inert material 92 is not magnetically sensitive. As illustrated in FIGS. 9A and 9B, the inert material 92 can be included on opposing sides of the layer 94 with magnetically sensitive particles. FIG. 9A illustrates an initial position. The layer 94 with magnetically sensitive particles 14 is in an undeformed position in FIG. 9A. The layer 94 can be a film or a flexible layer, for example. The undeformed position can be an initial position. The undeformed position can be a position in the absence of a contact force being applied to the force detection system.

FIG. 9B illustrates deformation due to force applied by an object, such as a finger 95 as shown. The inert material 92 contributes to actively deforming the layer 94 with magnetically sensitive particles 14 in a specific area. As shown in FIG. 9B, the inert material 92 helps displace the layer 94 with magnetically sensitive particles 14. The force detection system of FIGS. 9A and 9B can include any suitable sensors or sensing systems to detect the movement of the magnetically sensitive particles 14 due to the applied force. The sensors can detect a shape and/or profile associated with the applied force. The structures of the inert material 92 can impact such a shape or profile. Inert structures can be modified and/or optimized to improve sensitivity depending on the specifications of the application. The container 93 that includes the magnetically sensitive particles within the medium can be flexible.

Magnetically sensitive material can be included within a medium. The magnetically sensitive material can include first magnetically sensitive material and second magnetically sensitive material. The first magnetically sensitive material and the second magnetically sensitive material can be in different planes in an initial position. The initial position can correspond to no detectable external force being applied to a container. The shapes and profiles of the incorporated material (and containers) can be constructed to enhance and/or optimize the ability of the magnetic sensing structures (AMR, GMR, MMR, TMR, inductive sensing, fluxgate etc.) to detect movement and/or position of magnetically sensitive material.

Figures 10, 11:
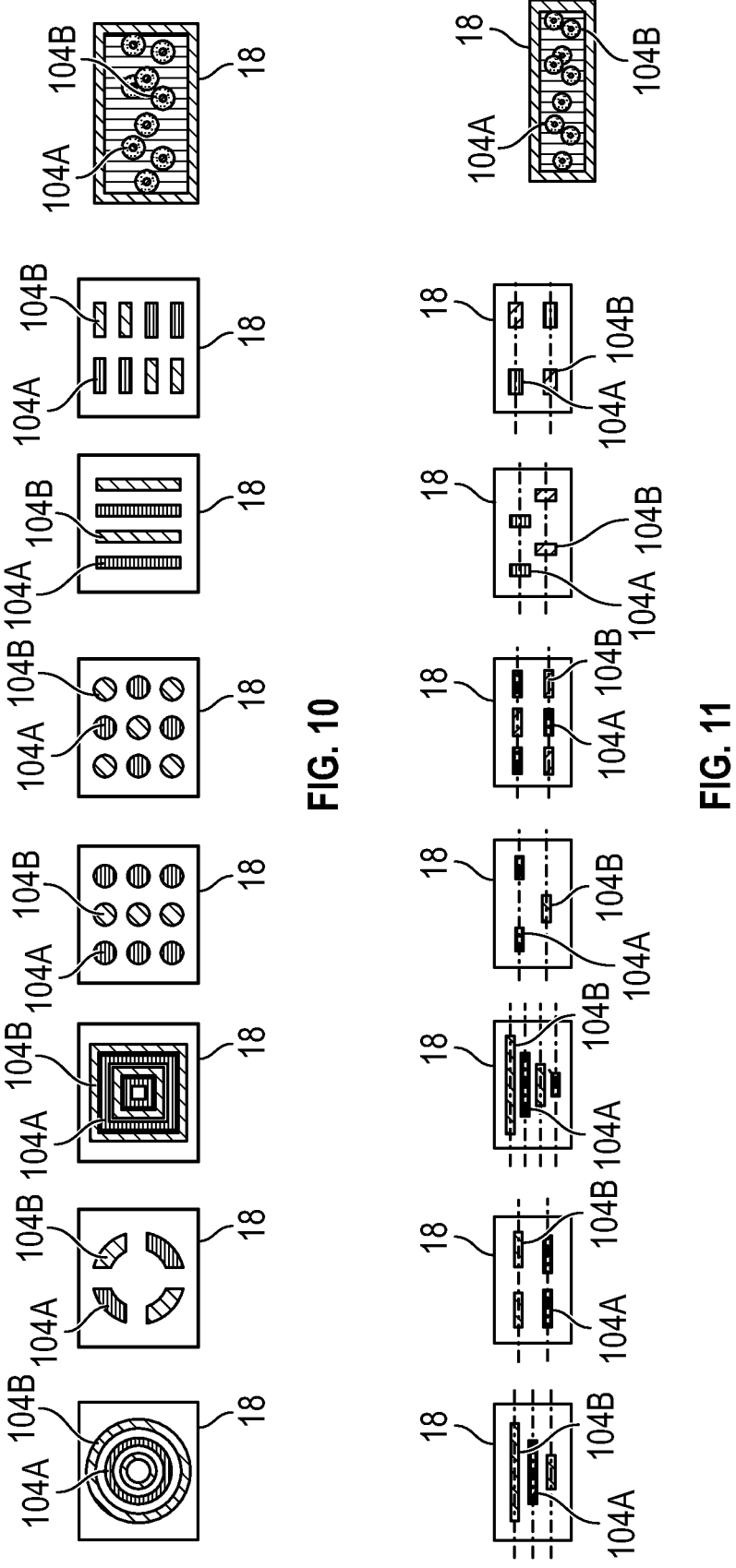
FIG. 10 illustrates a variety of plan views of a film or gel that includes magnetically sensitive particles or structures embedded in different planes according to embodiments.
FIG. 11 illustrates side or cross-sectional views corresponding to the plan views of FIG. 10.

FIG. 10 illustrates plan views of a plurality of containers 18 that each include magnetically sensitive material 104A, 104B in different planes in an initial position. The container 18 can be a flexible container. The container 18 can be a flexible encasement around the medium in which the magnetically sensitive material 104A, 104B is included. In some applications (not illustrated in FIG. 10), the magnetically sensitive material 104A, 104B can be included within a film or gel or flexible material that is not enclosed within a container, where force applied to a surface of the film or gel can be detected. The container 18 can deform in response to a force applied to a surface of the container 18. The medium within the container 18 can alternatively or additionally be compressed and/or deformed in response to force applied to the container 18.

The magnetically sensitive material 104A, 104B can include magnetically sensitive particles. Such magnetically sensitive particles can be within a fluid, within a gel, within a phase change material, within a flexible material, or embedded in a film. The magnetically sensitive material 104A, 104B can include a solid magnetic structure. Such magnetic structures can be within a fluid, within a gel, within a phase change material, within a flexible material, or embedded in a film. The magnetically sensitive material 104A, 104B can be electrically conductive in certain applications.

In the plan views of FIG. 10, first magnetically sensitive material 104A and second magnetically sensitive material 104B are in different planes. The first magnetically sensitive material 104A and the second magnetically sensitive material 104B can have substantially the same composition. The first magnetically sensitive material 104A and the second magnetically sensitive material 104B can have different compositions.

FIG. 11 illustrates side or cross-sectional views of the containers 18 of FIG. 10 with first magnetically sensitive material 104A and the second magnetically sensitive material 104B in different planes. The different planes are along different dashed lines in several of the containers 18 shown in FIG. 11. In some instances, different magnetically sensitive materials can be in three or more different planes.

Figure 12:
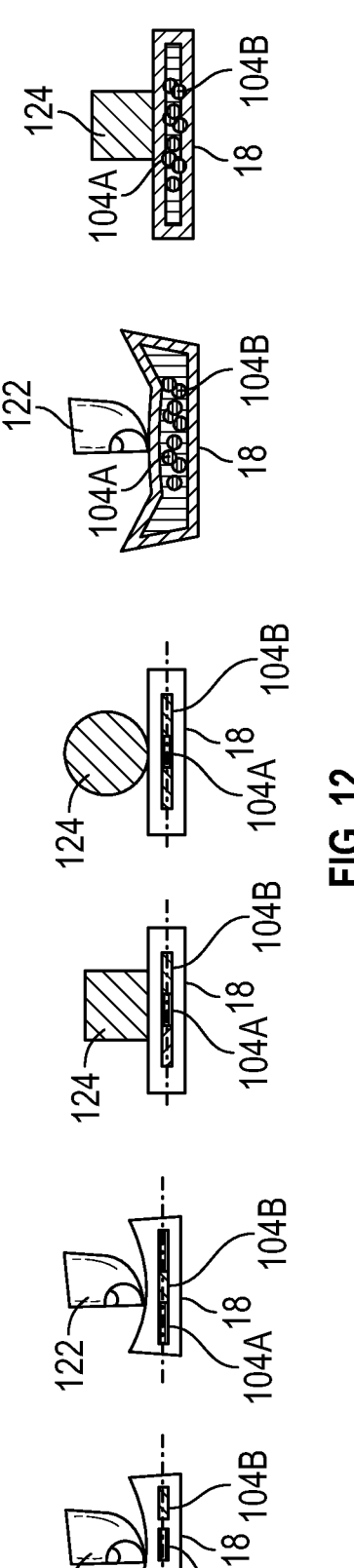
FIG. 12 illustrates force being applied to the systems of FIGS. 10 and 11 to align magnetically sensitive particles or structures according to embodiments.

As force is applied to the container 18, the container 18 can deform. This can cause the first magnetically sensitive material 104A and the second magnetically sensitive material 104B to be aligned with each other. FIG. 12 illustrates side or cross-sectional views of some of the containers 18 of FIGS. 10 and 11 with first magnetically sensitive material 104A aligned with second magnetically sensitive material 104B. In FIG. 12, a force is being applied to the container 18 by an object to cause the first magnetically sensitive material 104A to be aligned with second magnetically sensitive material 104B. The first magnetically sensitive material 104A and second magnetically sensitive material 104B are both along a plane represented by a dashed line in several views of FIG. 12. The shape and/or profile of the magnetically sensitive material 104A and/or 104B can be selected so that on alignment or movement in response to a force, the magnetically sensitive material 104A and/or 104B can be detected by one or more sensing structures.

In the examples shown in FIG. 12, the object can be a finger 122 or a mechanical moving body 124. The object can apply a force that moves at least some of the magnetically sensitive material 104A and/or 104B. In some instances, the finger 122 applies force by touching the container 18. In some other instances, the mechanical moving body 124 applies force to the container 18. Mechanical pressure on a surface (e.g., a top surface) of the container 18 can compress the medium and cause the magnetically sensitive material 104A to be aligned with the magnetically sensitive material 104B. As illustrated in FIG. 12, the magnetically sensitive material 104A and the magnetically sensitive material 104B can be aligned in a common plane.

One or more sensors can detect such alignment. The one or more sensors can output an electrical signal indicative of the force applied to the container 18. One or more of pressure, position, or object detection can be determined from the electrical signal generated by the one or more sensors. The one or more sensors can include a magnetic sensor, an inductive sensor, or any other suitable sensor configured to detect alignment of the first magnetically sensitive material 104A with the second magnetically sensitive material 104B. The detected alignment can be partial alignment and/or full alignment. Alignment can be detected when first magnetically sensitive material 104A and the second magnetically sensitive material 104B are both at least partly in a same plane.

Force detection based on relative positions of first magnetically sensitive material and second magnetically sensitive material is disclosed. Although embodiments may be discussed with reference to detecting force based on alignment of first and second magnetically sensitive material that are on different planes in an initial position, any suitable principles and advantages can be applied to detecting force based on first and second magnetically sensitive material being on different planes where the first and second magnetically sensitive material are aligned in an initial position.

Containers and Integrated Structures

A container can include one or more integrated structures, such one or more magnetic structures, one or more sensors, one or more biasing structures, one or more antennas, or the like. The container can be implemented in accordance with any suitable principles and advantages disclosed in one or more of U.S. patent application Ser. No. 17/933,600, filed Sep. 20, 2022; U.S. patent application Ser. No. 18/299,627, filed Apr. 12, 2023; U.S. patent application Ser. No. 18/170,765, filed Feb. 17, 2023; U.S. patent application Ser. No. 18/323,798, filed May 25, 2023; or U.S. patent application Ser. No. 18/053,523, filed Nov. 8, 2022; the the technical disclosures of each of which are herein incorporated by reference in their entireties and for all purposes. A sensor can detect magnetically sensitive material within an enclosure. For example, one or more sensors can detect alignment of magnetically sensitive material that were on different planes in an initial position. As another example, one or more sensors can detect a profile associated with magnetically sensitive material upon application of force to a container. The profile can be associated with one or more structures integrated with a side of the container, one or more structures external to an inner volume of the container, one or more inert structure configured to actively displace the magnetically sensitive material upon application of force, the like, or any suitable combination thereof. A temperature sensor can be implemented together with one or more sensors that detect the magnetically sensitive material. A biasing structure can be arranged to reset position of magnetically sensitive material within a container. Example structures that can be integrated with a container will now be discussed. Phase change materials can be included within the system structures to enable temperature monitoring. Any suitable principles and advantages of these integrated structures can be implemented together with each other.

Figures 13A, 13B:
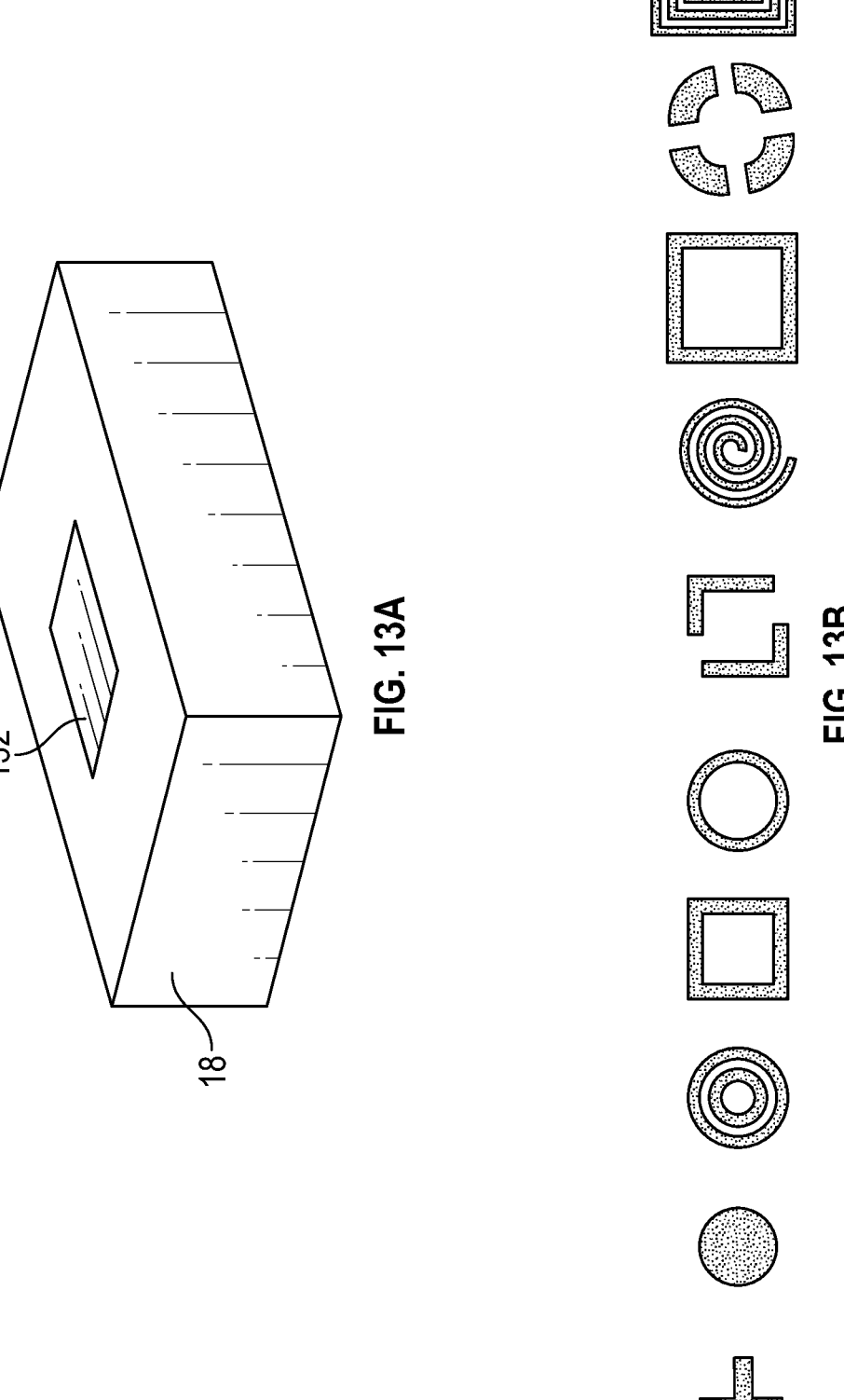
FIG. 13A illustrates a container or enclosure that includes magnetically sensitive particles with an integrated structure according to an embodiment.
FIG. 13B illustrates example patterns of the magnetic material for the integrated structured of FIG. 13A.

FIG. 13A is a schematic isometric view of an example container 18 with an integrated structure 132 according to an embodiment. The container 18 can be a compressible or flexible structure containing magnetically sensitive material in a medium. For example, the container 18 can include magnetically sensitive particles within a fluid. The structure can be a laminate including flexible layers, compressible materials, layers with magnetic particles and/or magnetic structures, etc. The integrated structure 132 can be a sensor configured to detect magnetically sensitive material within the container, such as a magnetoresistive sensor or a fluxgate sensor. The integrated structure 132 can be located on a surface of the container 18. The integrated structure 132 can be included on and/or within one or more layers of the container 18. The integrated structure 132 can be located in any suitable position of the container 18, such as on a top and/or a bottom of the container 18. The integrated structure 132 can be on a different side of the container 18 than a side at which a force being detected is applied. The integrated structure 132 can be on a side of the container 18 at which a force being detected is applied.

In some instances, the integrated structure 132 can be a magnetic structure. The integrated structure 132 can be a magnetic structure on the container 18. Such a magnetic can be a block of magnetic material, layers of magnetic material, or a pattern of magnetic material. The shape and/or structure of such a magnetic structure can be selected for a particular application. This can enable detection/sensitivity to a specific direction of particle movement and/or cluster, shape, direction, etc. FIG. 13B illustrates example magnetic material patterns for the integrated structure 132 on the container 18 of FIG. 13A that is a magnetic structure.

Conductive structures can also be deposited on and/or integrated with a container that includes magnetically sensitive particles in a fluid. Such conductive structures can provide signal transmission, manipulate and/or interactive with the magnetically sensitive particles, or the like.

Figure 13C:
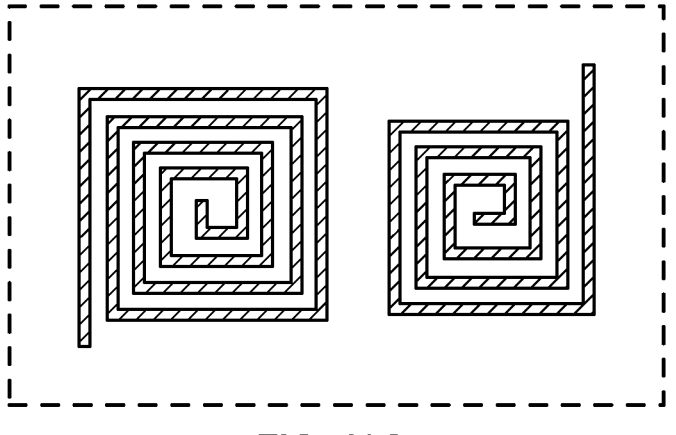
FIG. 13C illustrates examples of coils for antennas that can be implemented on the container of FIG. 13A.

FIG. 13C illustrates examples of coils for antennas that can be implemented on the container 18 of FIG. 13A. Such antennas can wirelessly transmit signals associated with a force (e.g., presence of force, magnitude of force, direction of force, etc.) applied to the container 18. In certain applications, an antenna can be included in a radio frequency identification (RFID) tag. As shown in FIG. 13C, a pair of antennas can be implemented. The antennas can be on the container 18 of FIG. 13A, for example.

Figure 13D:
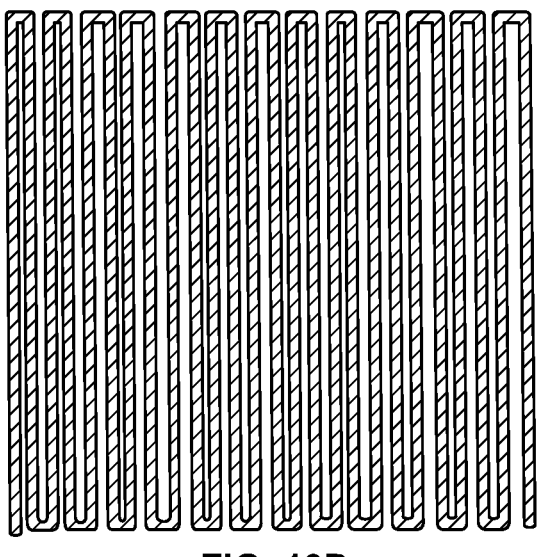
FIG. 13D illustrates an example meander shaped structure that can be implemented on the container of FIG. 13A.

FIG. 13D illustrates an example meander shaped structure that can be implemented on the container 18 of FIG. 13A. The integrated structure 132 of FIG. 13A can have the meander shape shown in FIG. 13D. The meander shaped structure can generate a gradient magnetic field. In certain applications, a gradient magnetic field generated by a meander shaped structure can attract magnetically sensitive particle better than a magnetic field generated by a coil. Being able to move particles can enable a reset of the haptic system. Such particle movement can be achieved in a number of ways, such as using an electromagnet.

Figure 13E:
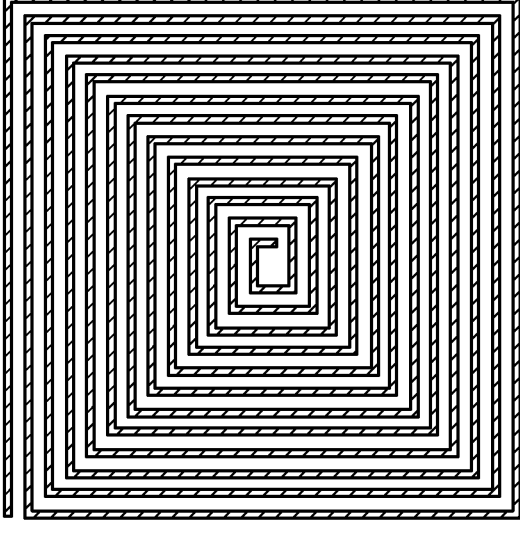
FIG. 13E illustrates an example coil shaped structure that can be implemented on the container of FIG. 13A.

FIG. 13E illustrates an example coil shaped structure that can be implemented on the container 18 of FIG. 13A. The integrated structure 132 of FIG. 13A can have the coil shown in FIG. 13E. The coil shaped structure can generate a magnetic field in certain applications.

Figures 14, 15:
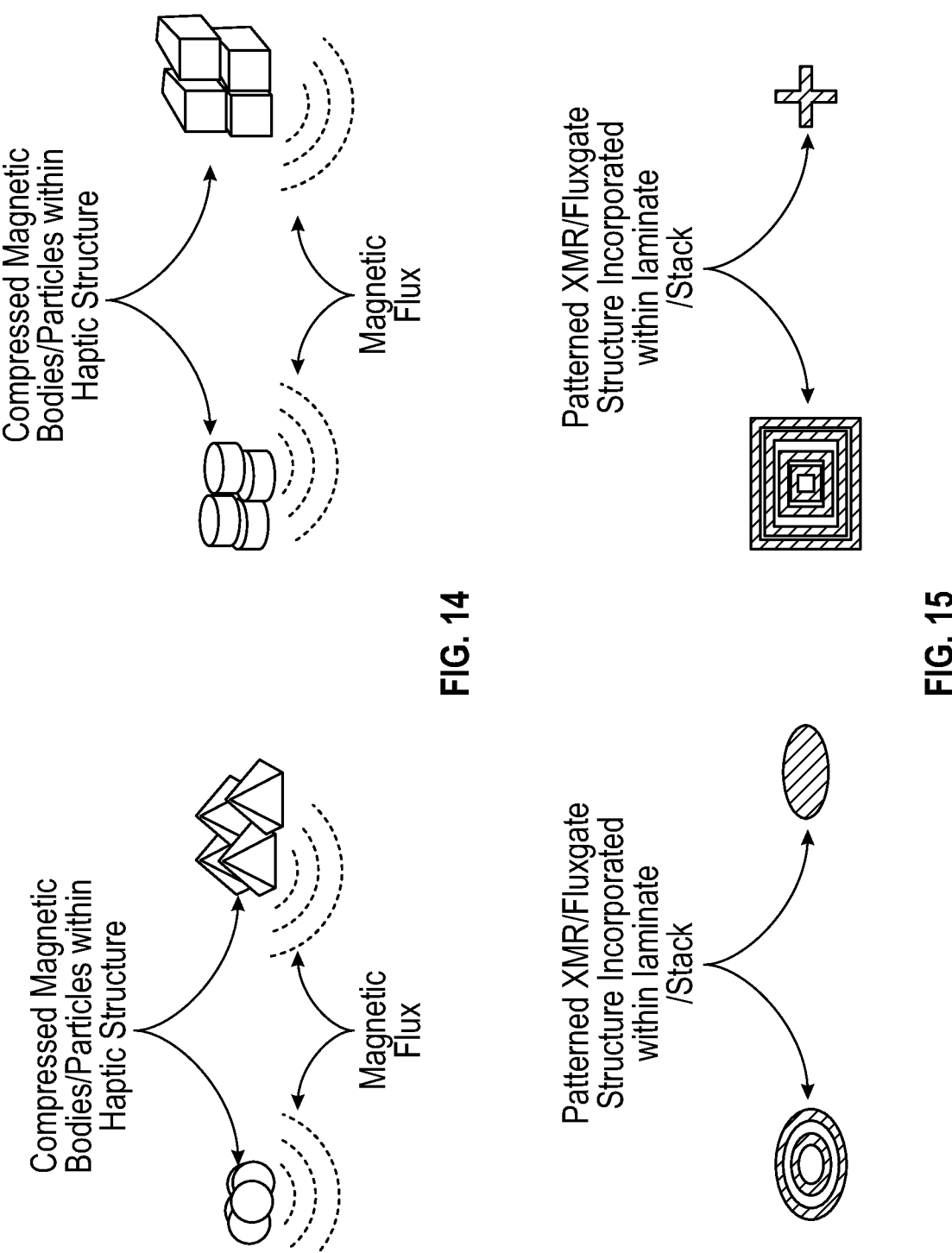
FIG. 14 illustrates example compressed magnetic bodies and/or structures or particles with different shapes within a haptic structure according to embodiments.
FIG. 15 illustrates example magnetic sensors included within haptic systems that can detect movement of the magnetic bodies and/or particles within haptic structures according to embodiments.

FIG. 14 illustrates example compressed magnetic bodies and/or particles within a haptic structure according to embodiments. These magnetic bodies and/or particles can generate magnetic flux. The magnetic bodies and/or particles can be included within a container and/or embedded within a material inside the container. The shape/size/profile can be modified to enhance and/or optimize sensitivity and/or detection of clusters/movement, etc. by the sensing structures incorporated within the system.

Examples of the integrated structure 132 of FIG. 13A are provided in FIG. 15, where the integrated structure is a magnetic sensor. The magnetic sensor can detect a change and/or position of magnetically sensitive material caused by compression of a container and/or a medium. The magnetic sensor can be included on a surface of a container, within a laminate substrate, within a stack of a haptic sensing system, or the like.

FIG. 15 illustrates example magnetic sensors included within haptic systems that can detect movement of the magnetic bodies and/or particles within haptic structures according to embodiments. Such magnetic sensors can include patterned magnetoresistive (xMR) or fluxgate structures incorporated within the haptic system. These magnetic sensors can enable relatively high sensitivity magnetic particle/structure detection. Such detection can involve detecting one or more of proximity, movement, direction, shape/contours, or the like. One or more of shapes, sizes, profiles, or constructions of the sensing structures can be selected to improve sensitivity and/or detection of one or more of particle clusters, direction of movement, shape of object causing deflection, or the like depending on the specifications of the application.

The magnetic material properties and magnetic sensor properties can be selected for achieving a desired detection sensitivity for a particular application. The magnetic material properties can include one or more of size, shape, composition, or the like. The magnetic sensor properties can include one or more of pattern, thickness, or material. The magnetic sensor can be an xMR sensor or a fluxgate sensor, for example.

Sensing structures can use an inductive sensing technique. A coil having an inductance that changes based on a distance from a conductive material can be used for force sensing. For a material that is conductive and ferromagnetic, relatively high sensitivity detection can be achieved.

Medium Material with Change in Viscosity and/or Phase

In some instances, the magnetically sensitive particles can be included in a medium material that can change viscosity and/or state in response to a change in temperature, for example, as described in U.S. patent application Ser. No. 18/053,523, filed Nov. 8, 2022, the disclosure of which is hereby incorporated by reference in its entirety and for all purposes. Any suitable principles and advantages of magnetically sensitive particles in a medium material and/or a phase change material disclosed in U.S. patent application Ser. No. 18/053,523 can be implemented in accordance with any suitable principles and advantages disclosed herein.

Phase change materials can be used as a medium such that the particles within such phase change materials only move when temperature is above or below a threshold temperature. With such phase change materials, force detection can be enabled and/or disabled at particular ambient temperatures. In some instances, a medium can include a material that changes viscosity with temperature so as to adjust mobility of particles within the medium. This can adjust sensitivity of force detection based on temperature.

Incorporating phase change material enables increased sensitivity within the system. For example, a threshold temperature to start detecting force and/or the temperature of the object in proximity to the structure can be detected. If the magnetically sensitive material does not move within phase change material until a specific temperature had been reached, an indication of the temperature of a body (adjacent or pressing against the structure) can be monitored.

Another application is related to safety in civil infrastructure, such as bridges, structures supporting electrical lines, or other safety related and/or safety critical structures. Defection can be measured, where there can be higher deflection tolerance at low ambient temperatures and lower deflection tolerance at higher temperatures. At the same time, maximum dynamic range can be desired. With force detection using magnetically sensitive particles in a medium material that changes viscosity with temperature, more resolution at higher temperatures and lower resolution at lower temperatures can be achieved for force detection.

Figure 16A:
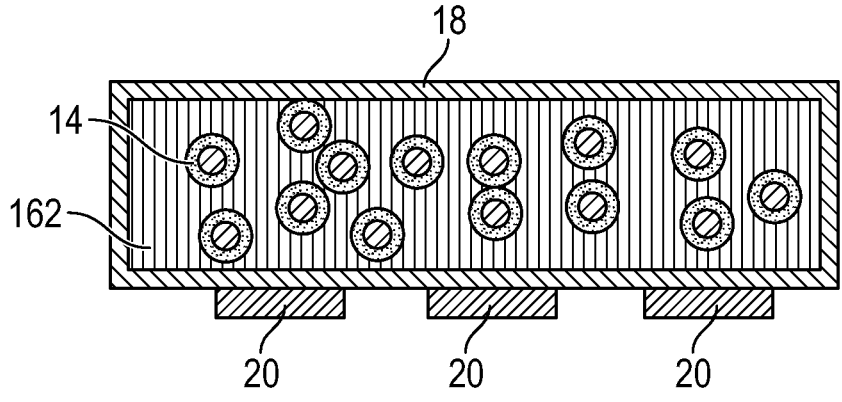
FIGS. 16A and 16B illustrate an example force detection system with magnetically sensitive particles within phase change material according to an embodiment.
Figure 16B:
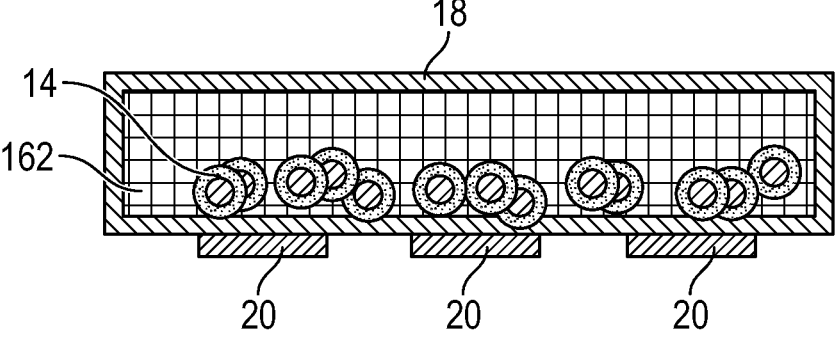

FIGS. 16A and 16B illustrate an example force detection system with magnetically sensitive particles 14 within phase change material 162 according to an embodiment. As illustrated in FIGS. 16A and 16B, the force detection system includes a container 18, magnetically sensitive particles 14 in phase change material 162, and sensors 20.

The phase change material 162 can be a gel or fluid with different physical states at different temperatures. For example, the phase change material 162 can be solid at room temperature and liquid at a higher temperature. At a higher temperature, the magnetically sensitive particles 14 can move in the phase change material 162. For instance, wax, coconut oil, or fat are example materials that are solid at room temperature and liquid at higher temperatures. The phase change material 162 can be used in accordance with any suitable principles and advantages of any of the force detection and/or haptic sensing systems disclosed herein.

FIG. 16B illustrates a state where the phase change material 162 is at a higher temperature than in FIG. 16A and the magnetically sensitive particles 14 have a higher mobility in the material 162 than in FIG. 16A. A force can be applied to compress the container 18 and move the magnetically sensitive particles 14 to the positions shown in FIG. 16B. The sensors 20 can detect the magnetically sensitive particles 14. A measurement circuit connected to the sensors 20 can output an indication of the applied force. The measurement circuit can process one or more outputs from the sensors to determine the applied force.

Example Applications

Haptic sensing systems and/or force detection systems disclosed herein can be implemented in a variety of applications. Example applications related to a robotic handling device, a charging port for a vehicle, a docking station, and a charging arm will now be discussed. Haptic sensing can provide useful information for controlling a robotic handling device. In electric vehicle charging applications, haptic sensing can be used to determine positioning and/or alignment associated with a charging port.

Sensors can be incorporated into a variety of robotic arms with multiple fingers and/or sensor types. Such sensors can monitor bodies with magnetic properties or specific shapes that can deform a container so that a specific shape or profile can be detected. For example, particles and/or structures can be moved in defined paths or areas after impact or force so that the movement of structures or clusters can be more easily detected by sensing structures in defined locations.

Robotic arms with haptic sensing systems can help robots accomplish a variety of complex tasks, such as handling fragile objects. Systems can be constructed and modified as part of locking or engagement mechanisms as part of a docking process. This can enable and/or initiate certain other functions depending on the application.

There are a large number of applications for technology disclosed herein. An example application is remote surgery with haptic feedback. For example, a scalpel can have a blade is not fixed but connected to a strong hook with very little motion. When the scalpel touches the skin, a small deflection in the blade can be detected. When skin is cut, less deflection can be detected as the hook is a bit released. Also, depending on the nature of the tissue, the resistance to the motion will be different. The feedback that the doctor would have in a classical surgery can be reproduced.

Different combinations of sensors, magnetically sensitive material (e.g., magnetically sensitive particle types), mediums (e.g., films, flexible substrates, gels, or fluids) containing the magnetically sensitive material) can achieve different sensitivities depending on the application. In some instances, conductive particles embedded within a flexible film, a gel, or a fluid can be implemented for force detection.

A temperature sensor can be included with a haptic sensing system to implement a magnetic skin. Such a magnetic skin can detect temperature. This can provide an indication of heat (e.g., a burn) or cold. Phase change material can be incorporated in the haptic sensing system. The magnetic skin can provide a robot with tactile information including applied force and temperature.

Figures 17A, 17B:
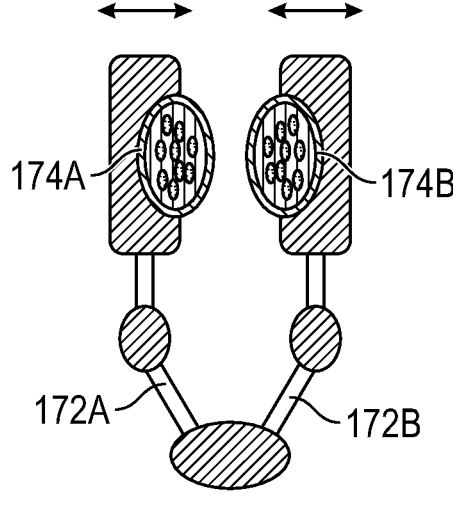
FIGS. 17A, 17B, and 17C illustrate example robotic handling devices or mechanisms with a force detection system according to embodiments.
Figure 17C:
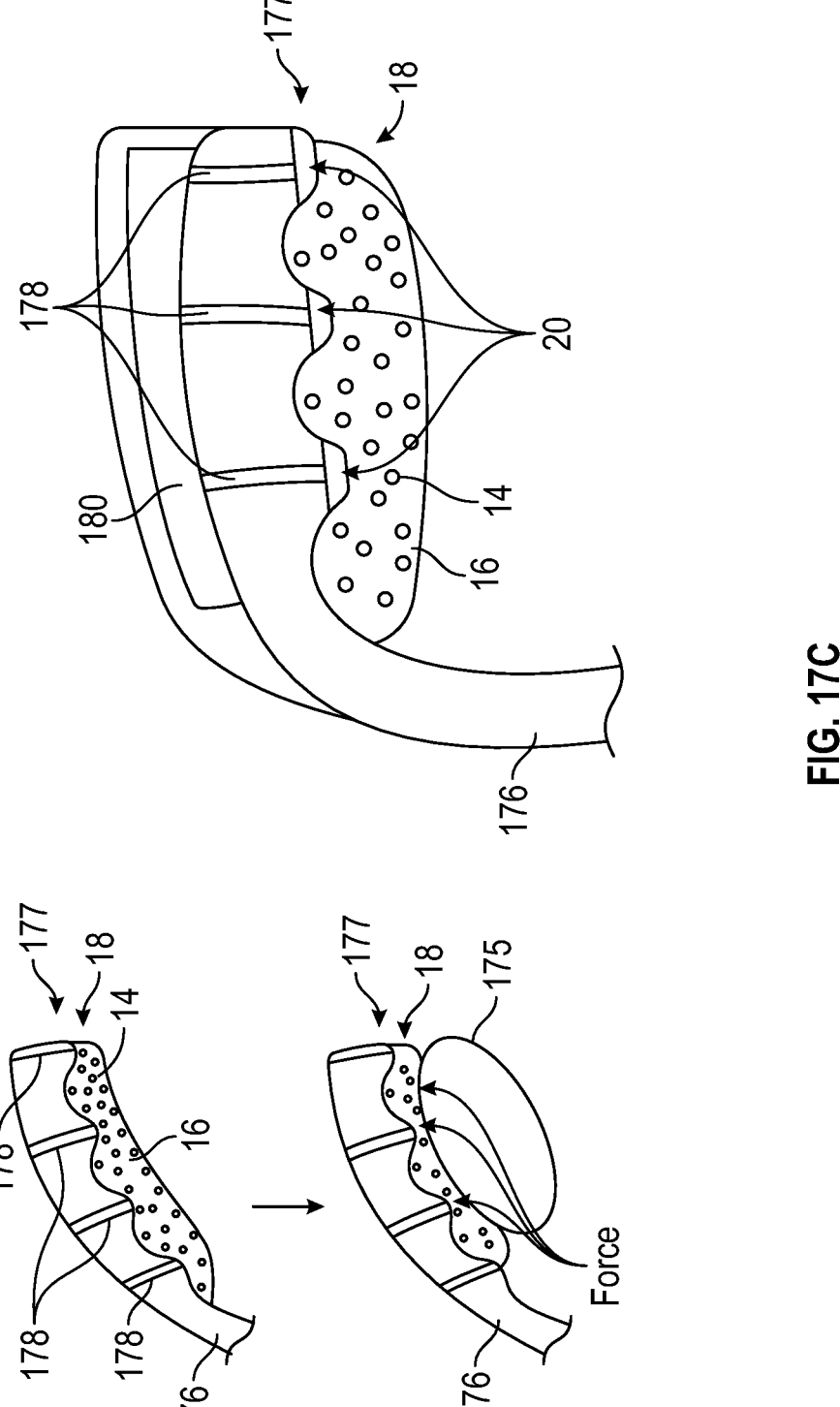

FIGS. 17A, 17B, and 17C illustrate example robotic handling devices with a force detection system according to embodiments. As shown in FIG. 17A, a robotic grabbling device can include a plurality of movable robotic fingers 172A, 172B having respective haptic sensing systems 174A and 174B. FIG. 17B illustrates another robotic grabbing device with a plurality of movable robotic fingers 172A, 172B having respective haptic sensing systems 174A and 174B. The haptic sensing systems 174A, 174B can be modules that include a container, magnetically sensitive materials, and one or more sensors. The haptic sensing systems 174A and/or 174B can include a measurement circuit configured to process one or more output signals from sensor(s).

The haptic sensing systems 174A, 174B can provide useful information for controlling the robotic grabbing device. Such information can be used for precise control of the robotic grabbing device. The robotic grabbing device can be connected to a robotic arm, for example. The haptic sensing systems 174A, 174B can be implemented in accordance with any suitable principles and advantages disclosed herein. Moreover, such haptic sensing systems 174A and/or 174B can be implemented together with a temperature sensor in certain applications. One or more of the shape, size, or construction of the system can be modified depending on the specifications of the application.

FIG. 17C illustrates a robotic arm 176 with a haptic sensing system 177. Such a haptic sensing system can be implemented on a robotic digit, such as a finger. As illustrated, the haptic sensing system 177 includes magnetically sensitive and/or electrically conductive particles 14 within a medium 16 in a container 18. One or more conductive paths 178 to a surface of the container 18 can be implemented. The one or more conductive paths 178 can include one or more through silicon vias with electrically conductive material included therein. As the haptic sensing system of the robotic arm comes in physical contact with an object 179, the container 18 is compressed.

In FIG. 17C, the robotic arm 176 includes a topography that can concentrate the magnetically sensitive and/or electrically conductive particles 14 in particular areas of the container 18 upon force being applied to the container 18. Such force can be applied by an object 175. The topography can be a mechanical structure of a robotic arm. The compression of the container 18 can cause the magnetically sensitive and/or electrically conductive particles 14 to concentrate (e.g., cluster) in one or more areas of the container 18. The compression of the container 18 can cause the magnetically sensitive and/or electrically conductive particles 14 to concentrate in two or more particular areas of the container 18.

Sensors 20 can be integrated with the container 18 to detect the magnetically sensitive and/or electrically conductive particles 14. The sensors 20 can be any suitable sensors capable of detecting clusters of the magnetically sensitive and/or electrically conductive particles 14. Examples of the sensors 20 include, but are not limited to, magnetoresistive sensors, AMR/GMR/TMR sensors, and other types of suitable magnetic sensors depending of the application specifications.

A module or system in a package (SIP) 180 can include processing circuitry (e.g., a measurement circuit) to detect a profile of the magnetically sensitive and/or electrically conductive particles 14 based on outputs from the sensors 20. A SIP can include one or more of processing circuitry, passives, discrete circuit elements, chiplets, etc. The module or SIP 180 can be electrically connected to the sensors 20 by conductive paths 178 that include features (e.g., through silicon vias with electrically conductive material therein) as illustrated in FIG. 17C. In some instances, the module or SIP 180 can include one or more antennas and wireless communication circuitry configured to support reception and/or transmission of wireless signals. The module or SIP 180 can include such antenna(s) and wireless communication circuitry in certain applications. The shape, size, etc. of elements within the system can be modified as desired depending on the specifications of an application.

Figure 18:
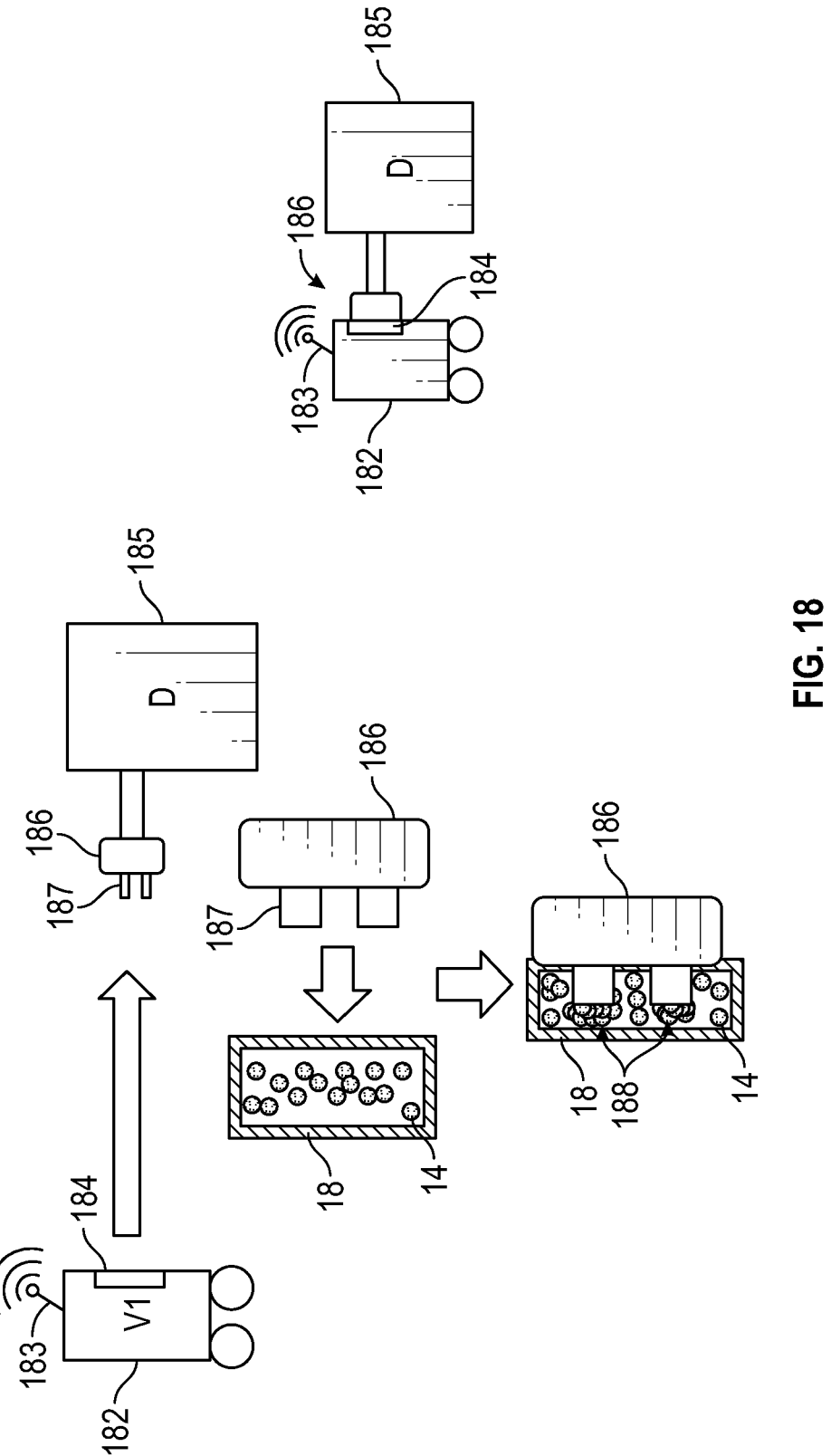
FIG. 18 illustrates an example charging port (or interlocking mechanism) with a haptic sensing system according to an embodiment.

A haptic sensing system with magnetically sensitive particles can be included in a charging port that connects to a docking station or any system with an interlocking mechanism and/or with verification of the interlocking mechanism. FIG. 18 illustrates an example charging port with a haptic sensing system according to an embodiment. The haptic system can be used as part of an interlocking or docking mechanism or system. An electric vehicle 182 can transmit and/or receive wireless signals via one or more antennas 183. The electric vehicle 182 can include a module 184 that includes magnetically sensitive particles 14 in a haptic sensing system. A docking station 185 can include a connector 186 (e.g., a plug) with a defined mechanical structure 187 or pattern. The docking station 185 can include hardware configured to implement diagnostics for the electric vehicle 182.

As the connector 186 of the docking station 185 comes into contact with and applies force to the module 184, compression causes the magnetically sensitive particles 14 to concentrate in defined areas 188 of a container 18 of the module 184 due to the mechanical structure 187 of the connector 186. One or more sensors of the module 184 can detect a profile of the magnetically sensitive particles 14 associated with the force applied to the container 18. The one or more sensors can generate one or more output signals indicative of the profile. The module 184 can include processing circuitry to process the outputs of the one or more sensors. The profile can be a result of the mechanical structure 187 of the connector 186 and the force applied to the container 18 that includes the magnetically sensitive particles 14. Alternatively or additionally, the docking station 185 can include one or more sensors to detect the profile of the magnetically sensitive particles 14.

In certain applications, at least one side of a module can have a topography, profile, or mechanical structure to concentrate magnetically sensitive material for detection of a force or an object through compression of the module in on one or more specific regions.

A docking mechanism can include magnetically sensitive particles (e.g., ferromagnetic particles or paramagnetic particles) within a medium (e.g., a gel or a flexible substrate). Such a docking mechanism can incorporate one or more metallic and/or magnetic structures on different planes that align when the stack is compressed. One or more sensors can detect such alignment and generate an electrical output associated with the alignment. Such sensors can be used as part of a safety enabling system to engage/dis-engage circuit breakers, etc.

A structure in accordance with any suitable principles and advantages of the embodiment of FIG. 17C can be implemented in a charging port, a docking station, or any other suitable application.

Figure 19:
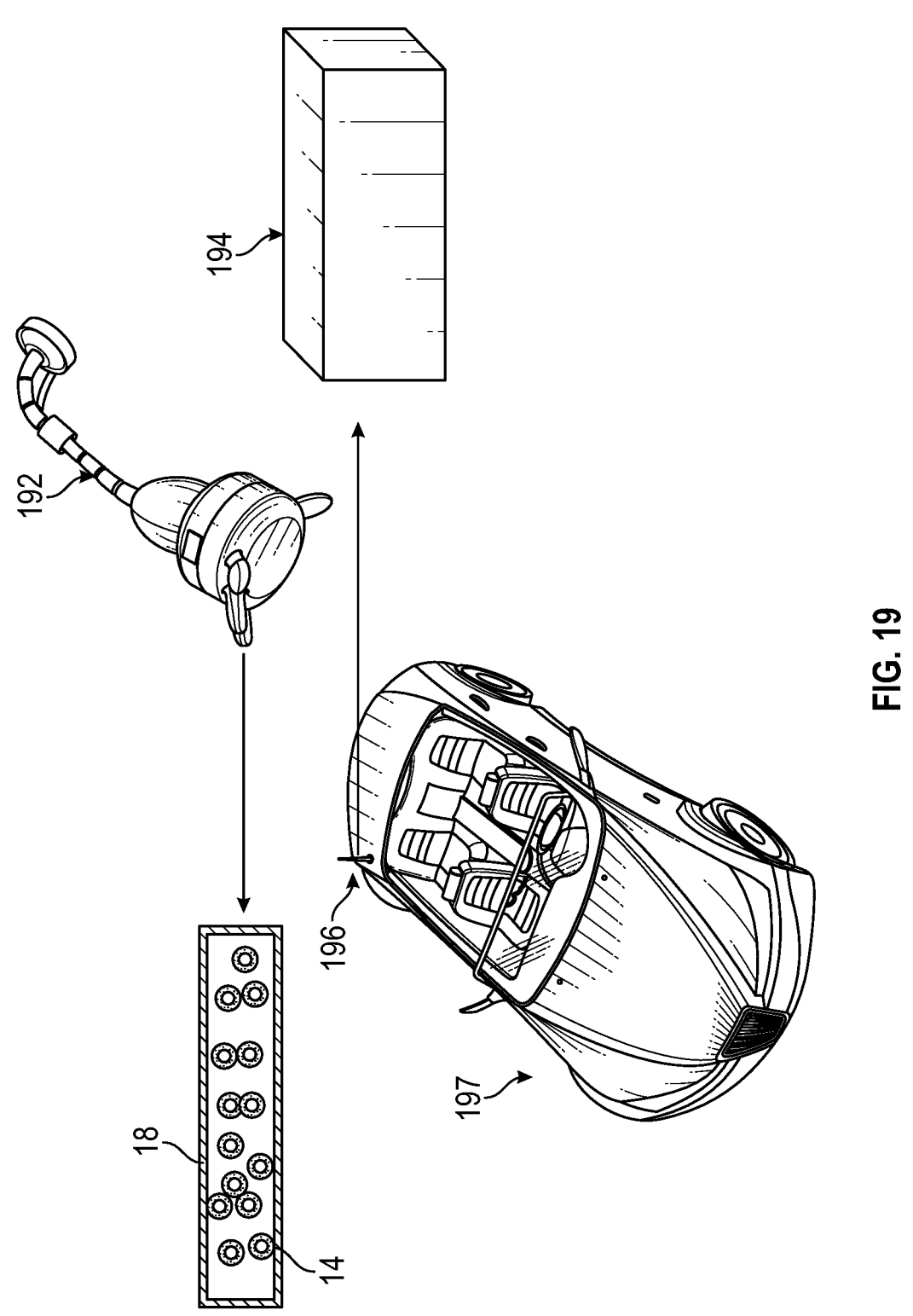
FIG. 19 illustrates an example charging arm, which can be for an electric vehicle as an example, with a haptic sensing system according to an embodiment.

FIG. 19 illustrates an example charging arm 192 with a haptic sensing system according to an embodiment. The charging arm 192 can include a container 18 with magnetically sensitive particles 14. The charging arm 192 can include a magnet 194 configured to generate a magnetic field. The magnet 194 can provide a magnetic bias or back bias. The charging arm 192 coming in contact with a charging port 196 of an electric vehicle 197 can cause the magnetically sensitive particles 14 to move in the container 18 such that the magnetically sensitive particles 14 are concentrated (e.g., clustered) in areas of the container 18 due to the mechanical structure of the charging port 196. For example, the magnetically sensitive particles 14 can be concentrated in at least two particular areas of the container 18. The haptic sensing system can detect a profile of the magnetically sensitive particles 14 associated with the charging port 196 of the electric vehicle 197 applying force on the container 18. The charging arm can be controlled based on the profile of the magnetically sensitive particles 14.

In certain applications, a charging port of an electric vehicle can include the haptic sensing system and biasing magnetic to detect a profile associated with the charging arm being in contact with the charging port.

Magnetically Sensitive Particles

Magnetically sensitive particles can have one or more properties for implementing haptic sensing and/or force detection. For example, magnetically sensitive particles can be constructed, shaped, patterned, or the like so the magnetically sensitive particles respond to a force and/or can be detected in a desired way. As one example, a spiral shaped magnetic particle can respond to a force and move in the medium differently than a spherical or square shaped particle. The viscosity of the medium and the shape of the magnetically sensitive particle can be balanced for movement of the magnetic particle in response to an applied force. In certain applications, the magnetically sensitive particles can be coated with an electrically conductive material (e.g., gold) such that when a certain amount of particles cluster or align, a conductive path is formed between electrical contacts in a container. In some applications, the magnetically sensitive particles can be coated with a coating to enhance optical detection, such as a coating to achieve one or more of a desired optical contrast, color, fluorescence, luminescence, or another optical property. In certain instances, magnetically sensitive particles can be coated so as to not chemically react with a surface or other structure.

The shape of magnetically sensitive particles can affect how the magnetically sensitive particles move and cluster in certain applications. Depending on the outermost material, magnetically sensitive particles may stick together. In some applications, the magnetically sensitive particles can be coated with a thin material, such as Teflon or another polymer, so that there is little or no potential for the magnetically sensitive particles to stick together and/or cluster for any reason other than a response to a magnetic field. The container can incorporate one or more conductive vias and connections from the internal surfaces to the external. The container can incorporate one or more optical conduits and/or areas that facilitate optical detection of particle clusters or movement.

Magnetically sensitive particles can be constructed to move and/or respond in different ways. Sensitivity, such as movement, to certain magnitudes of force can be improved with certain particle constructions, shapes, etc. The magnetically sensitive particles can be combined with and/or embedded within non-magnetic material to provide the effect of a partially patterned structure. The combined structure can then be inserted within a fluid, a gel, flexible substrate or a film.

In some instances, magnetically sensitive particles can include an outer coating that is magnetically sensitive. As an example, magnetically sensitive particles can be a polystyrene bead coated with nickel and/or another magnetically sensitive material. Such magnetically sensitive particles can have an overall density of magnetic material that is lower than a homogenous sphere of magnetically sensitive material. In some other examples, magnetically sensitive particles can have magnetically sensitive core materials and coatings selected to enhance or inhibit interaction with each other and/or the surrounding fluid. For example, the outer coating could be polystyrene, PTFE, Teflon, or some other polymer that can inhibit particles sticking together other than in a desired way as a response to stimulus from a magnetic field.

In certain instances, magnetically sensitive particles have an electrically conductive outer surface. For example, magnetically sensitive particles can be coated with gold. With such magnetically sensitive particles, an electric contact between two electrodes in a container can be closed.

Magnetically sensitive particles can have a coating with one or more specific optical properties in some applications. With such a coating, one or more of a contrast, a color, luminescence or fluorescence can be achieved. The coating with one or more specific optical properties can aid optical detection of magnetically sensitive particles.

Magnetically sensitive particles can be ferromagnetic, ferrimagnetic, paramagnetic, or diamagnetic. Diamagnetic particles are repelled by a magnetic field. In contrast, paramagnetic and ferromagnetic particles are attracted by a magnetic field.

The magnetically sensitive particles can have any suitable size for a particular application. The magnetically sensitive particles can be sized such that individual magnetically sensitive particles have a diameter larger than individual openings of a container. In certain applications, magnetically sensitive particles are micrometer scale or larger. In some applications, magnetically sensitive particles are millimeter-scale particles. Magnetically sensitive particles can be larger than millimeter-scale. In certain applications, magnetically sensitive particles can have a particle width in a range from about 50 nanometers to 1 millimeter. In some such applications, particle width can be in a range from about 0.1 micron to 100 microns. In some of these applications, particle width can be in a range from about 0.5 micron to 100 microns.

Magnetically sensitive particles can have a shape to influence their movement and/or orientation in the fluid such that their sensitivity to an applied force is enhanced and/or optimized. In certain applications, it may be desirable to have a non-symmetrical magnetically sensitive particle so that the magnetically sensitive particle moves in a particular way when exposed to a magnetic field. A particular particle shape combined with a fluid or gel of a particular viscosity can provide a desired sensitivity to an applied force. Different particle sizes and shapes can be combined as desired for a range of target sensitivities within a system. The particles can also be constructed to have a shape that, for example, facilitates clustering or physical joining together of groups of particles.

Figures 20A, 20B:
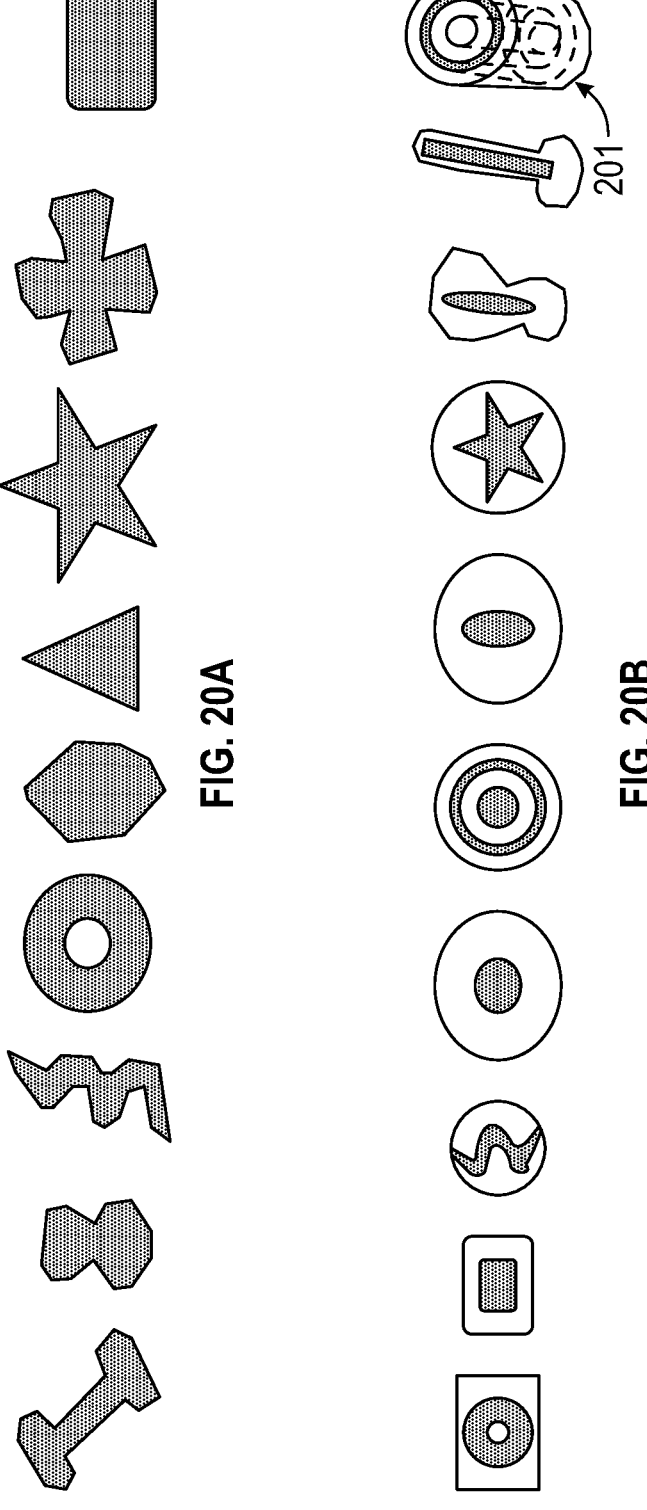
FIG. 20A illustrates example shapes of magnetically sensitive particles.
FIG. 20B illustrates example combined structures with magnetically sensitive particles included within non-magnetic material.

FIG. 20A illustrates example shapes of magnetically sensitive particles. The magnetically sensitive particles can be added to an inert, non-magnetic material to form a combined structure. FIG. 20B illustrates example combined structures with magnetically sensitive particles included within non-magnetic material. The particle construction (e.g., one or more of shape, size, construction, composite, constituent matter, layers, etc.) can be modified and optimized depending on the specifications of a particular application. Various processes, such as molding, printing, laser cutting, sputtering, plating, laminating, and the like, can be used to fabricate composite particles incorporating magnetically sensitive particles so that the magnetically sensitive particles react in a desired manner to a magnetic field. For example, with an outer non-magnetic layer, when a number of the composite particles come together, they may be held in a cluster by a magnetic field/force. Such composite particles can have non-magnetic material come into physical contact with one or more other composite particles. Such a construction can be desirable to allow release of such composite particles from one another in the absence of the magnetic field. For example, spherical particles with magnetic cores and covered with polystyrene/PTFE may be less likely to stick together and may bounce off each other. A combination of particle shape (e.g., spiral shape, propeller shape, etc.) and fluid viscosity can determine sensitivity and/or speed of a response to a magnetic field stimulus. One or more of the particle shape, construction and size can be modified and/or optimized depending on the specifications of a particular application.

Magnetically sensitive particles can have various sizes and densities. If all particles are the same size, a contact surface area can be relatively small. By using a plurality of sizes (e.g., large and small), a bridging structure can have more contact points. This can allow smaller particles to reduce resistance/increase current carrying capability.

As shown in FIG. 20B, magnetically sensitive particles can include a functional coating. The functional coating can attract, repel, interact with, reduce friction, or the like. In some applications, a sleeve or cylinder 201 with an opening at the center can have a magnetically sensitive material embedded within a wall.

The magnetically sensitive particles can have coatings that can be chemically active or otherwise functional. Functional coatings can act through effecting specific chemical, photochemical, or biochemical properties. Magnetically sensitive particles can be functionalised with particular chemistries (e.g., amino groups or hydroxyl groups). For example, magnetically sensitive particles can be coated with a surfactant type material, PTFE to reduce friction between magnetically sensitive particles and enable relatively quick response times when exposed to a stimulus within a container. Anti-reflective or/and anti-corrosion or/and anti-microbial coatings can be applied depending on the specifications of a particular application. Such coatings can include, for example, Ag, Cu, organosilanes, r quaternary ammonium, or the like. Antimicrobial surfaces can be functionalized in a variety of different processes. A coating may be applied to a surface that has a chemical compound that is toxic to microorganisms. Alternatively, a surface can be functionalized adsorbing a polymer and/or polypeptide and/or by changing its micro and/or nanostructure.

Coatings to attract or repel certain elements can be applied. The specific coating applied may depend on the specifications of a particular system. Technologies such as nanoparticle deposition could be used to attach nanoparticles to solid surfaces of the magnetic/conductive particles creating coatings that could be constructed to react with the presence of specific elements.

A combination of different particle sizes, shapes, coatings, and/or one or more other properties can enhance force detection sensitivity.

Figure 20C:
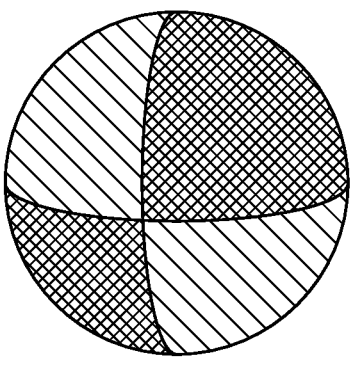
FIG. 20C illustrates an example magnetically sensitive particle with a magnetic material on a surface.

FIG. 20C illustrates an example magnetically sensitive particle with a magnetic material on a surface. Material on the surface of a magnetically sensitive particle can be a patterned magnetic material. The patterned magnetic material can be soft magnetic material. By defining poles on the particle surface, the magnetically sensitive particles can structure themselves differently. Different stacking arrangements of the magnetically sensitive particles can be achieved by different magnetic material patterns. The presence of an external magnetic field can disturb such a structure and allow for the creation and removal of bridging elements. The particles can have a sufficient size for patterning magnetic material on their surfaces. Particles can build chains in a magnetization direction. Out of plane magnetization for patterned magnetic material on particle surfaces can be desirable. A particle surface patterned with a magnetic material can effect how a particle moves or responds when exposed to a varying magnetic field or effect the detectability of a cluster of particles.

Figure 20D:
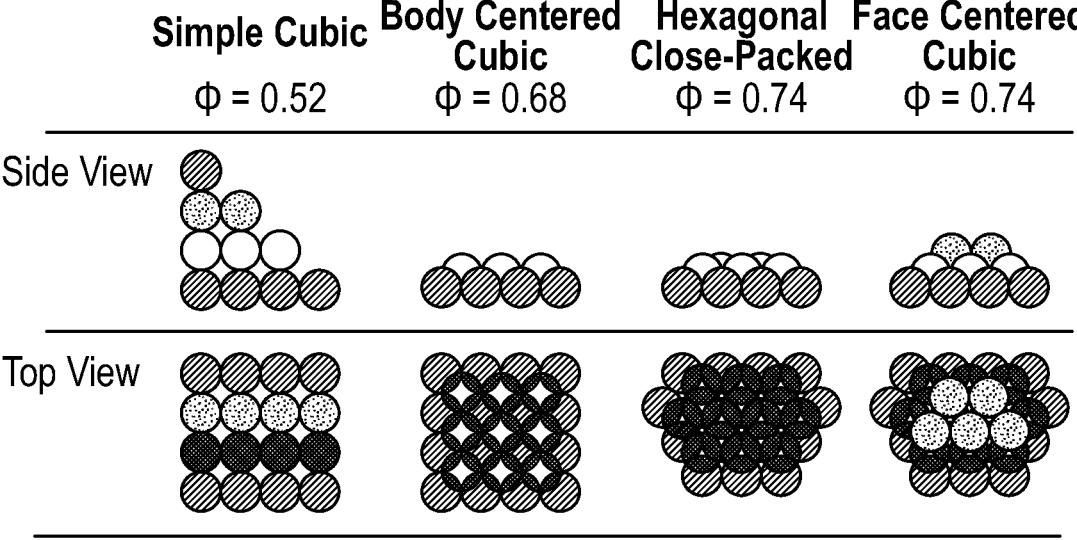
FIG. 20D shows examples of clusters of particles.

Magnetically sensitive particles can have various sizes and densities. If all particles are the same size, a contact surface area can be relatively small. By using a plurality of sizes (e.g., large and small), a bridging structure can have more contact points. This can allow smaller particles to reduce resistance/increase current carrying capability. FIG. 20D shows examples of how combining different types of particles can result in clustering with different shapes, which can be useful for detection purposes.

Processing Circuitry and Signal Transmission

Systems and modules disclosed herein can include processing circuitry to process one or more received signals (e.g., electrical signals) from one or more sensors of a force detection system and/or providing one or more signals to bias and/or control one or more elements of the force detection system.

A force detection system can include a circuit arranged to receive and process electrical signals from the one or more sensors of the force detection system. FIG. 21A illustrates an embodiment of a sensor 20 and a processing circuit that may be used to receive and manipulate electrical signals from the sensor 20. The processing circuit can include an amplification circuit 200, an analog-to-digital converter (ADC) 204, and a processor or controller 208. The amplification circuit 200 can be electrically coupled to the sensor 20 to receive an output of the sensor 20 and perform one or more of buffering or amplifying the signal received from the sensor. The amplification circuit 200 can include any suitable amplifier to perform the buffering or amplifying. The ADC 204 can covert an output of the amplification circuit 200 from an analog signal to a digital signal. The processor or controller 208 can perform one or more of processing the received digitized signal to extract information from the digitized signal or generate a control signal as a function of the digitized signal.

A force detection system can include a circuit to generate and provide an electrical signal to one or more sensors and/or other structures of the force detection system. FIG. 21B illustrates an embodiment of a sensor 20 and a circuit that may be used to generate and provide an electrical signal to the sensor 20. The circuit may include a processor or controller 216, a digital-to-analog converter (DAC) 220, and a driver circuit 224. The processor or controller 216 can generate a control signal representing an electrical signal to be provided to the sensor 20 or another element of the force detection system. The processor or controller 216 may generate the control signal by as a function of a digitized signal representing a signal output by the sensor 20 or another signal. The DAC 220 can receive the control signal output by the processor or controller 216 and convert the control signal from a digital signal to an analog signal. The driver circuit 224 can receive the analog signal output from the DAC 220 and provide a corresponding drive signal to the sensor 20 and/or another element of the force detection system. The driver circuit 224 may perform one or more of buffering or amplifying the signal from the DAC 220. The driver circuit 224 may include one or more transistors to perform the buffering or amplifying.

A force detection system can include a circuit to generate and provide an electrical signal based on a signal from one or more sensors 20, such as a signal representing an applied force, for transmission via one or more antennas. FIG. 21C depicts an embodiment of force detection system that includes a sensor 20 and a circuit that may be used to generate and provide an electrical signal to a transmitting element 251. The circuit may include an amplification circuit 245, and ADC 247, a transmitter 249 and a transmitting element 251 such as a conductive coil, antenna, etc. The amplification circuit and ADC may be configured and operate as discussed above. The transmitter circuit may be electrically coupled to the ADC to receive the digital signal output by the ADC and provide a corresponding transmission drive signal to the transmitting element.

Force detection systems can wirelessly communicate with another device. Such a system can include one or more antennas that can wirelessly transmit information associated with applied force, position of magnetically sensitive particles, object detection, a profile of magnetic material, alignment of magnetic structures, the like, or any suitable combination thereof. The one or more antennas can wirelessly communicate any other suitable information.

Figure 22:
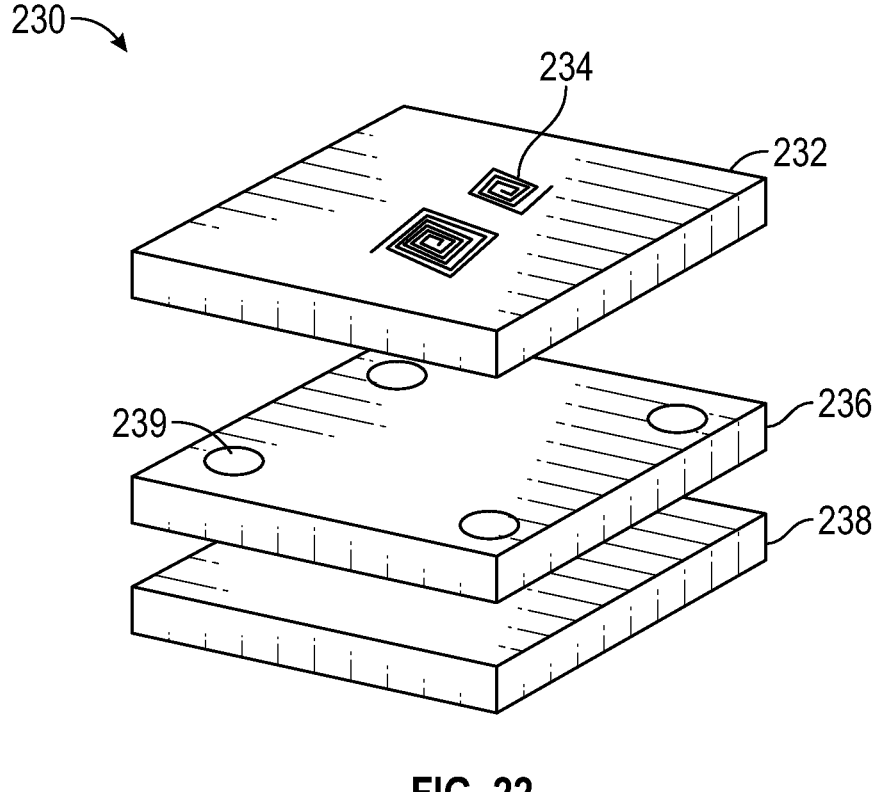
FIG. 22 illustrates an exploded schematic view of an example system with wireless communication according to an embodiment.

FIG. 22 illustrates an exploded schematic view of an example force detection system 230 according to an embodiment. The force detection system 230 includes a wireless communication layer 232 that includes one or more antennas 234, a layer 236 including an integrated circuit that includes circuitry of a measurement circuit, and a layer 238 that includes a container with magnetically sensitive material (e.g., magnetically sensitive particles) for force detection control in accordance with any suitable principles and advantages disclosed herein. Conductive vias 239 and/or traces can electrically connect layers of the force detection system 230. The one or more antennas 234 can include a coil, for example. The one or more antennas 234 can be included in a radio frequency identification (RFID) tag. The wireless communication layer 232 can include circuitry to support wireless signal transmission, or such circuitry may be provided in a lower layer, such as the layer 236. Such circuitry can encrypt any suitable information for wireless signal transmission. The one or more antennas 234 can transmit encrypted data. A wireless communication layer can be incorporated within a SIP, module, or system in a number of ways. It can be stacked or placed side by side or heterogeneously constructed using chiplets (with incorporated coils and structures). The force detection system 230 can also incorporate conductively coupled and/or optical methods of communication. The system construction can be modified and/or optimized depending on the specifications of a particular application.

Conclusion

In the embodiments described above, apparatus, systems, and methods for adjusting fluid flow using particles in a container are described in connection with particular embodiments. It will be understood, however, that the principles and advantages of the embodiments can be used for any other systems, apparatus, or methods with a need for adjusting fluid flow.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments have been described, these embodiments have been presented by way of example only and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system with force detection, the system comprising:
first magnetically sensitive material;
second magnetically sensitive material;
a container that encloses a medium, the first magnetically sensitive material and the second magnetically sensitive material, wherein the first magnetically sensitive material and the second magnetically sensitive material are embedded in the medium;
one or more sensors integrated with the container and configured to provide a discernible signature indicative of a force applied to a surface of the container based on relative positions of the first magnetically sensitive material and the second magnetically sensitive material, wherein the discernible signature is based on a combination of the container, the first magnetically sensitive material, the second magnetically sensitive material, and the one or more sensors; and
processing circuitry integrated with the container, the processing circuitry configured to process one or more signals received from the one or more sensors.

2. The system of claim 1, wherein the first magnetically sensitive material and the second magnetically sensitive material are in different planes in an initial position, and wherein the one or more sensors are configured to detect the force based on alignment of the first magnetically sensitive material and the second magnetically sensitive material.

3. The system of claim 1, wherein the first magnetically sensitive material and the second magnetically sensitive material are aligned in an initial position, and wherein the one or more sensors are configured to detect the force based on the first magnetically sensitive material and the second magnetically sensitive material being in different planes.

4. The system of claim 1, wherein the medium is a fluid, and wherein the first magnetically sensitive material comprises magnetically sensitive particles in the fluid.

5. The system of claim 1, wherein the medium is a gel, and wherein the first magnetically sensitive material comprises magnetically sensitive particles in the gel.

6. The system of claim 1, wherein the first magnetically sensitive material is embedded in a film or a flexible substrate, and wherein the medium comprises the film or the flexible substrate.

7. The system of claim 1, wherein the first magnetically sensitive material comprises a solid magnetic structure.

8. The system of claim 1, wherein the one or more sensors comprise at least one patterned magnetic sensing structure.

9. The system of claim 1, wherein the container contains inert material configured to interact with the container and first magnetically sensitive material.

10. The system of claim 1, wherein the first magnetically sensitive material and the second magnetically sensitive material have substantially a same composition.

11. The system of claim 1, wherein the one or more sensors are configured to detect force by at least detecting a direction of the force.

12. A system with force detection, the system comprising:
first magnetically sensitive material, wherein the first magnetically sensitive material comprises magnetically sensitive particles in a phase change material;
second magnetically sensitive material; and
one or more sensors configured to detect a force based on relative positions of the first magnetically sensitive material and the second magnetically sensitive material.

13. A robotic device comprising the system of claim 12, wherein the system is configured to provide tactile information to the robotic device, and the tactile information includes temperature and the force.

14. The system of claim 12, wherein the system is configured to detect a temperature of a body in contact with the system.

15. The system of claim 12, further comprising a first container and a second container, the first container containing the first magnetically sensitive material and the phase change material, and the second container containing at least one of a different type of magnetically sensitive material or a different type of phase change material than the first container.

16. A method of force detection, the method comprising:
providing a container enclosing a medium, first magnetically sensitive material and second magnetically sensitive material therein in an initial position, wherein the first magnetically sensitive material and the second magnetically sensitive material are embedded in the medium; and
detecting, using one or more sensors and processing circuitry integrated with the container, a force applied to the container based on whether the first magnetically sensitive material is aligned with the second magnetically sensitive material in a second position, wherein the second position is different than the initial position.

17. The method of claim 16, wherein the first magnetically sensitive material is in a different plane than the second magnetically sensitive material in the initial position.

18. The method of claim 16, wherein the one or more sensors comprise a patterned magnetic sensing structure integrated with the container.

19. The method of claim 16, wherein the force is a shear force.

20. The method of claim 16, wherein the medium is a fluid, and wherein the first magnetically sensitive material comprises magnetically sensitive particles in the fluid.

* * * * *